United States Patent
Maki et al.

(10) Patent No.: US 9,747,036 B2
(45) Date of Patent: Aug. 29, 2017

(54) TIERED STORAGE DEVICE PROVIDING FOR MIGRATION OF PRIORITIZED APPLICATION SPECIFIC DATA RESPONSIVE TO FREQUENTLY REFERENCED DATA

(71) Applicant: Hitachi, Ltd., Tokyo (JP)

(72) Inventors: Nobuhiro Maki, Yokohama (JP); Yuri Hiraiwa, Sagamihara (JP); Kenichi Oyamada, Yokohama (JP)

(73) Assignee: HITACHI, LTD., Tokyo (JP)

( * ) Notice: Subject to any disclaimer, the term of this patent is extended or adjusted under 35 U.S.C. 154(b) by 332 days.

(21) Appl. No.: 14/596,707

(22) Filed: Jan. 14, 2015

(65) Prior Publication Data
US 2015/0127855 A1  May 7, 2015

Related U.S. Application Data

(63) Continuation of application No. 13/384,040, filed as application No. PCT/JP2011/006048 on Oct. 28, 2011, now Pat. No. 8,954,671.

(51) Int. Cl.
  *G06F 3/06* (2006.01)
  *G06F 17/30* (2006.01)
  *G06F 9/46* (2006.01)

(52) U.S. Cl.
  CPC ............ *G06F 3/061* (2013.01); *G06F 3/0602* (2013.01); *G06F 3/067* (2013.01); *G06F 3/0611* (2013.01);
  (Continued)

(58) Field of Classification Search
  None
  See application file for complete search history.

(56) References Cited

U.S. PATENT DOCUMENTS 5,606,689 A   2/1997   Nakagawa
6,324,620 B1  11/2001  Christenson et al.
(Continued)

FOREIGN PATENT DOCUMENTS

JP   05-173873   7/1993
JP   09-128276   5/1997
(Continued)

OTHER PUBLICATIONS

PCT Search Report and Written Opinion on application No. PCT/JP2011/006048 dated Dec. 20, 2011; 9 pages with partial English-language translation of Written Opinion, 1 page.

*Primary Examiner* — Brian Peugh
*Assistant Examiner* — Dustin Bone
(74) *Attorney, Agent, or Firm* — Foley & Lardner LLP

(57) ABSTRACT

Data is placed in tiered storage with a suitable granularity according to application characteristics. The storage apparatus comprises a controller for managing storage areas, provided by storage media of a plurality of types of varying performance, as pools, and for assigning the storage areas in page units to a virtual volume from any tiered storage among a plurality of types of tiered storage which the pool comprises in response to a data write request from the host computer, wherein, for specific data which is managed by the host computer, the controller specifies an area with a high referencing frequency among the specific data on the basis of organization information of the specific data, and moves this area to another of the tiered storage with a higher performance than an already assigned tiered storage.

20 Claims, 37 Drawing Sheets

(52) U.S. Cl.
CPC ......... *G06F 3/0644* (2013.01); *G06F 3/0647* (2013.01); *G06F 3/0649* (2013.01); *G06F 3/0659* (2013.01); *G06F 3/0689* (2013.01); *G06F 9/461* (2013.01); *G06F 17/30233* (2013.01); *G06F 3/0685* (2013.01)

(56) References Cited

U.S. PATENT DOCUMENTS

| | | |
|---|---|---|
| 6,904,599 B1 | 6/2005 | Cabrera et al. |
| 2006/0031649 A1 | 2/2006 | Murotani et al. |
| 2006/0059301 A1 | 3/2006 | Sugino et al. |
| 2008/0005508 A1 | 1/2008 | Asano et al. |
| 2008/0168228 A1 | 7/2008 | Carr et al. |
| 2009/0228655 A1 | 9/2009 | Yamane |
| 2009/0254719 A1 | 10/2009 | Sasage |
| 2009/0300285 A1 | 12/2009 | Nagai et al. |
| 2010/0191906 A1 | 7/2010 | Beniyama et al. |
| 2011/0072225 A1 | 3/2011 | Kawaguchi et al. |
| 2011/0167217 A1 | 7/2011 | Montgomery |
| 2011/0197046 A1 | 8/2011 | Chiu et al. |

FOREIGN PATENT DOCUMENTS

| | | |
|---|---|---|
| JP | 2007-066259 A | 3/2007 |
| WO | WO-2009/088007 A1 | 7/2009 |

FIG.7

JOB IN PROGRESS MANAGEMENT TABLE    112

| JOB NAME | DATA SET NAME | CONTROL AREA | PRIORITY LEVEL | START TIME |
|---|---|---|---|---|
| Job1 | AA00 | Index (0001-0002) | HIGH PRIORITY | 12:34 |
| Job2 | BB00 | Directory (0010-0012) | LOW PRIORITY | 22:30 |
| : | : | : | : | : |

CONTROL TARGET DATA MANAGEMENT TABLE    113

| DATA SET NAME | DEVICE ID | STORAGE ADR | FILE ORGANI-ZATION | FILE ORGANI-ZATION DETAILS | PREVIOUS TIER POINTER |
|---|---|---|---|---|---|
| AA00 | Devn1 | 0001-0005 | VSAM | Index (0001-0002) | AA00 |
| BB00 | Devn2 | 0010-0015 | PARTI-TIONED | Directory (0010-0012) | NONE |
| ⋮ | ⋮ | ⋮ | ⋮ | ⋮ | ⋮ |

USER CONFIGURATION INFORMATION MANAGEMENT TABLE  114

| ITEM PRIORITY LEVEL | ITEM | CONFIGURATION CONTENT | TIERED STORAGE PRIORITY LEVEL |
|---|---|---|---|
| 1 | TIME | T3~T4 | HIGH PRIORITY |
| | | a : | : |
| 2 | JOB NAME | Aaaa | LOW PRIORITY |
| | | Baaa | HIGH PRIORITY |
| | | a : | : |
| 3 | JOB CLASS | A | HIGH PRIORITY |
| | | C | LOW PRIORITY |
| 4 | DATA SET | AA00 | HIGH PRIORITY |
| | | AB00 | HIGH PRIORITY |
| 5 | USER NAME | Test Usr01 | LOW PRIORITY |
| | | a : | : |

I/O FREQUENCY MANAGEMENT TABLE

| FILE ORGANIZATION | HIGH FREQUENCY I/O 1 | HIGH FREQUENCY I/O 2 | ACQUISITION METHOD |
|---|---|---|---|
| VIRTUAL STORAGE ACCESS | Index | ALL | OS utility1 |
| SEGMENT-PARTITIONED | Directory | ALL | OS utility2 |
| SEQUENTIAL | VTOC | UNCERTAIN | OS utility3 |
| INDEXED ORGANIZATION | UPPER DATA SET | UNCERTAIN | OS utility3 |
| VIRTUAL TAPE | HEADER | UNCERTAIN | VIRTUAL TAPE TOOL |
| ⋮ | ⋮ | ⋮ | ⋮ |

TIER USAGE STATUS TABLE    116

| TIER NUMBER | FULL CAPACITY (GB) | UNUSED CAPACITY (GB) | PAGE LOCKED CAPACITY (GB) | |
|---|---|---|---|---|
| | | | HIGH PRIORITY | LOW PRIORITY |
| 1 | 100 | 50 | 49 | 1 |
| 2 | 1,000 | 550 | 200 | 250 |
| 3 | 1,000,000 | 200,000 | 200,000 | 600,000 |

HOST CONFIGURATION MANAGEMENT TABLE — 118

| HOST ID (Host Name@192.168.1.1) | | | | |
|---|---|---|---|---|
| DATA SET NAME (AA00) | STORAGE DEVICE ID (Devn1) | STORAGE ADR (CCHH1-5) | STORAGE ID (14001) | VOLUME ID (LDEV01) |
| DATA SET NAME (BB00) | STORAGE DEVICE ID (Devn2) | STORAGE ADR (CCHH10-15) | STORAGE ID (14001) | VOLUME ID (LDEV02) |
| .. | .. | .. | .. | .. |

I/O FREQUENCY MANAGEMENT TABLE                         115

| FILE ORGANIZATION | HIGH FREQUENCY I/O 1 | HIGH FREQUENCY I/O 2 | ACQUISITION METHOD |
|---|---|---|---|
| VIRTUAL TAPE | HEADER | UPPER AREA | VIRTUAL SERVER TOOL |
| : | : | : | : |
| : | : | : | : |
| : | : | : | : |
| : | : | : | : |
| : | : | : | : |

11501     11502     11503     11504

TIERED STORAGE DEVICE PROVIDING FOR MIGRATION OF PRIORITIZED APPLICATION SPECIFIC DATA RESPONSIVE TO FREQUENTLY REFERENCED DATA

CROSS-REFERENCE TO RELATED PATENT APPLICATIONS

This application is a Continuation of U.S. application Ser. No. 13/384,040 (National Stage of PCT/JP2011/006048), filed Jan. 13, 2012, incorporated herein by reference in its entirety.

TECHNICAL FIELD

The present invention relates to a computer system and storage management method and is suitably applied to a computer system and storage management method which perform hierarchical management of data used by application programs.

BACKGROUND ART

Recent years have witnessed the popularization of information systems and their widespread use in a variety of regions. Work that has conventionally been performed manually is also currently coming to be replaced by information systems and the amount of processing that such information systems are expected to accomplish has also reached huge proportions. As a result, the processing which information processing systems are tasked with cannot be completed within the desired time.

Therefore PTL1 discloses a technology for important application programs (hereinafter application programs are referred to simply as applications) whereby data which is used by the applications is arranged in file units in storage devices provided with suitable I/O performance. PTL1 enables the processing to be completed within the target time at least for high priority applications. Here, a technology will be described hereinbelow that is referred to as tiered storage control and whereby, if storage devices comprise storage areas exhibiting a plurality of different characteristics (I/O performance and reliability and the like), the storage areas each being referred to as tiered storage, the data used by a computer system is placed in any of the plurality of tiered storage.

Furthermore, in PTL2, data which a storage device writes to a virtual storage area in the device is divided into fragments which are smaller than files or the like which are then arranged in designated tiered storage. Further, PTL2 discloses a technology whereby, after the data is arranged in designated tiered storage, the storage device re-arranges the fragments in the tiered storage with a suitable I/O performance depending on the frequency with which a host computer accesses the fragments. PTL2 enables the arrangement, in typically costly high I/O performance tiered storage (known as upper tiered storage), only of data requiring such performance, thereby diminishing the usage of such costly upper tiered storage, and hence a performance similar to the I/O performance of the upper tiered storage can be expected.

CITATION LIST

Patent Literature

[PTL 1]
 Japanese Published Unexamined Application No. H5-173873
[PTL2]
 Japanese Published Unexamined Application No. 2007-066259

SUMMARY OF INVENTION

Technical Problem

In PTL1, although high priority application data can be arranged in upper tiered storage, because tiered storage control cannot be executed in units which are smaller than a file, even though there may be a fragment with a low access frequency in a file, this file is placed in upper tiered storage, thereby needlessly consuming upper tiered storage. Furthermore, in PTL2, only fragments, among the application data, which are referred to frequently by the host computer can be placed in upper tiered storage; however, because tiered storage control is performed according to the frequency with which the data is referenced yet application priority level-dependent tiered storage control is impossible, this poses a problem.

The present invention was conceived in view of the foregoing points and proposes a computer system and a storage management method which enable data to be arranged in tiered storage with suitable granularity depending on the application characteristics.

Solution to Problem

In order to achieve the foregoing object, the present invention provides computer system in which a storage apparatus, a host computer which issues a data write request to the storage apparatus, and a management computer which manages the storage apparatus and the host computer are each interconnected via a network, wherein the storage apparatus comprises a controller for managing storage areas, provided by storage media of a plurality of types of varying performance, as pools, and for assigning the storage areas in page units to a virtual volume from any tiered storage among a plurality of types of tiered storage which the pool comprises in response to the data write request from the host computer, wherein, for specific data which is managed by the host computer, the controller specifies an area with a high referencing frequency among the specific data on the basis of organization information of the specific data, and moves this area to another of the tiered storage with a higher performance than an already assigned tiered storage.

According to this configuration, by using a management computer to manage the file organization of the data used by the application, the file organization characteristics can be used to identify application data usage characteristics, whereby it is possible to realize hierarchical control which is more precise than when using units such as files managed in an OS or the like. As a result, data can be arranged in tiered storage with an appropriate granularity according to the application characteristics in order to provide the high I/O performance sought by the user.

Advantageous Effects of Invention

The present invention enables data to be arranged in tiered storage with a suitable granularity according to the application characteristics, thereby enabling efficient usage of the storage device.

BRIEF DESCRIPTION OF DRAWINGS

FIG. 7 is a table showing the content of the job in progress management table according to this embodiment.

FIG. 8 is a table showing the content of a control target data management table according to this embodiment.

FIG. 9 is a table showing the content of a user configuration information management table according to this embodiment.

FIG. 10 is a table showing the content of an I/O frequency management table according to this embodiment.

FIG. 11 is a table showing the content of a tier control usage status management table according to this embodiment.

FIG. 13 is a table showing the content of a host configuration management table according to this embodiment.

FIG. 36 is a table showing the content of an I/O frequency management table according to this embodiment.

DESCRIPTION OF EMBODIMENTS

Figure 1:
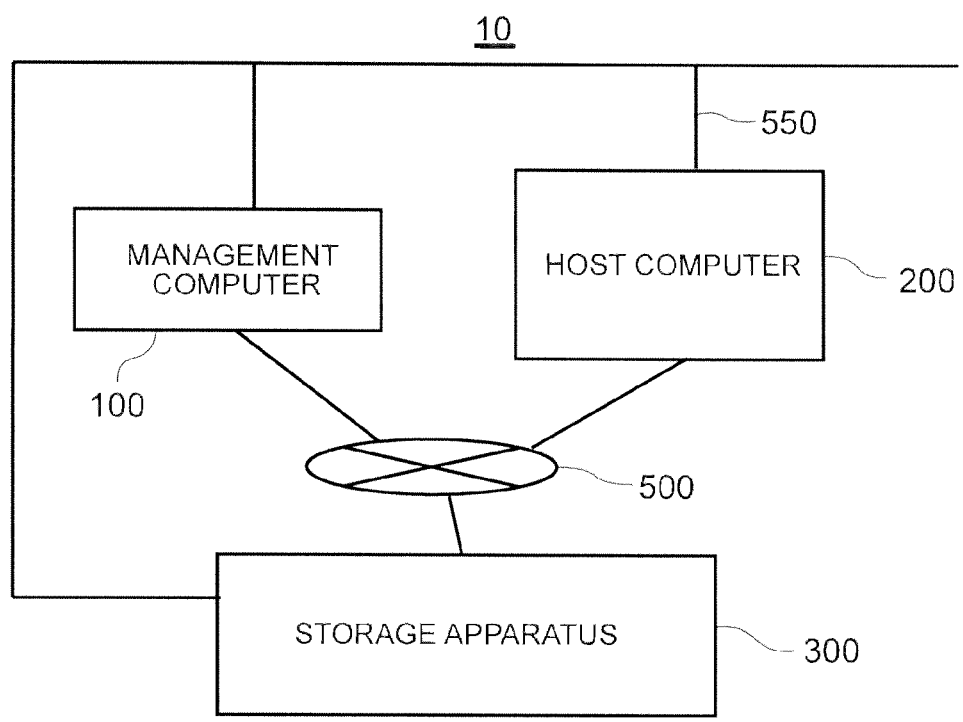
FIG. 1 is a block diagram showing a hardware configuration of a computer system according to a first embodiment of the present invention.

An embodiment of the present invention will be described in detail hereinbelow with reference to the drawings.

Note that although various information may be described using the expression "xxx table" in the following description, various information may also be expressed using a data structure other than a table. In order to indicate that there is no dependence on the data structure, the terms "xxx table" and "xxx information" may also be used.

Furthermore, although processing is described hereinbelow with the "program" as the subject, the program is executed by a processor which is contained in the controller (the CPU (Central Processing Unit), for example), the defined processing is performed while suitably using storage resources (memory, for example) and/or a communication interface device (a communication port, for example), the processing subject may also be a processor. The processing which is described with the program as the subject may be processing which is executed by a processor or a management system which comprises a processor (for example a display computer (a client, for example) or a management computer (a server, for example)). Furthermore, the controller may be the processor itself or may comprise a hardware circuit which includes all or part of the processing performed by the controller. The program may be installed in each controller from a program source. The program source may be a program distribution server or storage media, for example.

Note that the management computer comprises I/O devices. A display, keyboard, and pointer device are considered as examples of I/O devices, but other devices are also possible. Furthermore, as a substitute for an I/O device, a serial interface or internet interface (Internet is a registered trademark) may serve as an input device and a display computer comprising a display or keyboard or pointer device may be connected to the interface and display information may be transmitted to the display computer, and a display may be implemented by the display computer upon receiving input information from the display computer so that it is possible to switch between a display and an input by an input device by receiving an input.

Hereinafter, a set of one or more computers for managing a computer system and for managing and controlling a storage system will sometimes be referred to as a management system. In cases where a management computer displays display information, the management computer is a management system. Furthermore, the combination of a management computer and a display computer is also a management system. In addition, the same processing as the management computer may also be implemented by a plurality of computers in order to increase the speed and reliability of the management processing, and in this case, the plurality of computers (which also include a display computer if a display computer implements the display) are a management system.

Furthermore, although words such as "time" are employed in the following description, time may also denote information such as the year, month and day or may of course refer to the hour, minute and second (including fractions of a second).

(1) First Embodiment (1-1) Summary of Embodiment

Recent years have witnessed the popularization of information systems and their widespread use in a variety of regions. Work that has conventionally been performed manually is also currently coming to be replaced by information systems and the amount of processing that such information systems are expected to accomplish has also reached huge proportions. As a result, the processing which information processing systems are tasked with cannot be completed within the target time.

Therefore technology for important application programs (hereinafter application programs are referred to simply as applications) whereby data which is used by the applications is arranged in file units in storage devices provided with suitable I/O performance has been disclosed. Such technology enables the processing to be completed within the target time at least for high priority applications. Here, a technology will be described hereinbelow that is referred to as tiered storage control and whereby, if storage devices comprise storage areas exhibiting a plurality of different characteristics (I/O performance and reliability and the like), the storage areas are each called tiered storage and the data used by a computer system is placed in any of the plurality of tiered storage.

Furthermore, technology has been disclosed according to which data which a storage device writes to a virtual storage area in the device is divided into fragments which are smaller than files or the like which are then arranged in designated tiered storage. Further, after the data is arranged in designated tiered storage, the storage device re-arranges the fragments in the tiered storage with a suitable I/O performance depending on the frequency with which a host computer accesses the fragments. Such technology enables the arrangement, in typically costly high I/O performance tiered storage (known as upper tiered storage), only of data requiring such performance, thereby diminishing the usage of such costly upper tiered storage, and hence a performance similar to the I/O performance of the upper tiered storage can be expected.

However, with the foregoing technology, although data of high priority applications can be arranged in upper tiered storage, tiered storage control cannot be executed in units smaller than files. Hence, even when there are fragments with a low access frequency within a file, since this file is disposed in upper tiered storage, this is a problem in that the upper tiered storage is needlessly consumed. Further, it is possible, among the data of the application in a subsequent stage, to place in the upper tiered storage only those fragments which are frequently referenced by the host computer. However, since tiered storage control which corresponds to the data referencing frequency is then exercised, this precludes using tiered storage control which is dependent on the application priority level, which is a problem. For example, even in the case of data for which a short response time is essential, if such data has a low referencing frequency, this data is disposed in low tiered storage, and even if an application is of low priority, if such an application has a high referencing frequency, this application is disposed in upper tiered storage, thereby rendering efficient tiered storage control impossible.

Therefore, in this embodiment, data can be placed in tiered storage in smaller units than files depending on the priority level and characteristics of the application. Consequently, the designated application can be provided with the same performance, same execution time, and same transaction performance without any unnecessary consumption of the tiered storage.

(1-2) Hardware Configuration of Computer System

FIG. 1 shows a hardware configuration of a computer system 10. The computer system 10 is configured from a management computer 100, a host computer 200, and a storage apparatus 300. In the computer system 10, the management computer 100 and the host computer 200 may be the same computer or there may be one or more of each. Further, there may be one or more of the storage apparatus 300 in the computer system 10.

The management computer 100, host computer 200, and storage apparatus 300 are interconnected via a communication network (for example a SAN (Storage Area Network)) 500. Further, the management computer 100 is connected to the host computer 200 and storage apparatus 300 via a communication network (LAN (Local Area Network), for example) 550.

Figure 2:
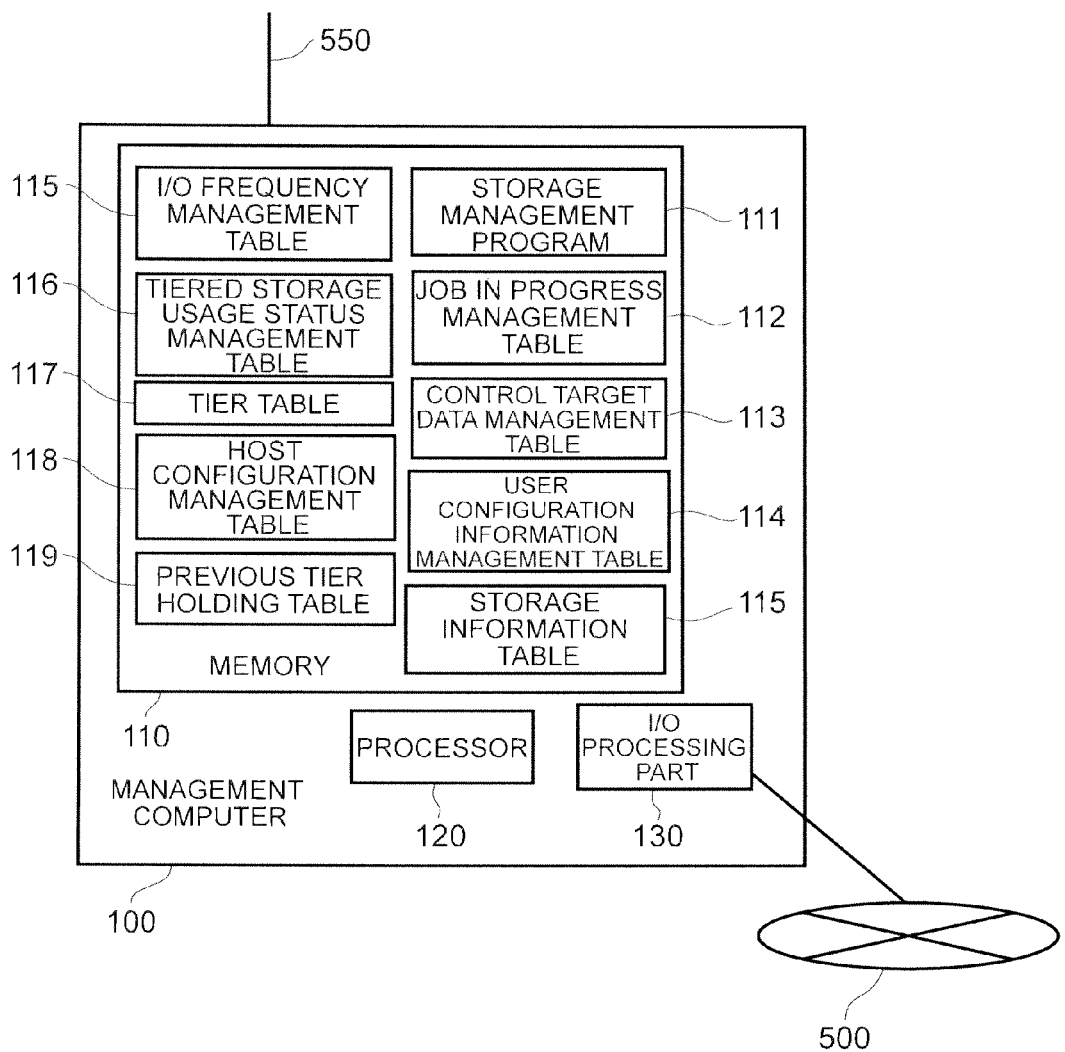
FIG. 2 is a block diagram showing a configuration of a management computer according to this embodiment.

FIG. 2 shows the configuration of the management computer 100. The management computer 100 is a computer which comprises a memory 110, a processor 120, and an I/O processing part 130. The memory 110, the processor 120 and the I/O processing part 130 are interconnected via an internal network (omitted from the drawing).

The processor 120 performs various processing by executing a program which is stored in the memory 110. For example, by transmitting an I/O request to the storage apparatus 300, the processor 120 controls the tiered storage which is executed by the storage apparatus 300. The I/O request contains, for example, a data access instruction or a tier control instruction. I/O requests will be described in detail subsequently.

The memory 110 stores information or the like which is required by the processor 120 and the program executed by the processor 120. More specifically, the memory 110 stores a storage management program 111, a job in progress management table 112, a control target data management table 113, a user configuration information management table 114, an I/O frequency management table 115, a tiered storage usage status management table 116, a tier table 117, a host configuration management table 118, a previous tier holding table 119, and a storage information table 101. Furthermore, the memory 110 may store an OS (Operating System) and an application program (AP).

The storage management program 111 is a program for managing the storage apparatus 300. The job in progress management table 112 is information for managing jobs, described subsequently. The control target data management table 113 is information relating to data that is used by the jobs. The user configuration information management table 114 relates to control target data and is information which is pre-configured by the user of the computer system 10. The I/O frequency management table 115 is information relating to application referencing characteristics. The tiered storage usage status management table 116 is information holding information and the like relating to the usage status of the tiered storage, described subsequently. The tier table 117 is a table which holds [information on] which real volume a designated logical volume is placed in by means of tiered storage control which will be described subsequently. This tier table 117 is characteristic information which makes it possible to specify the characteristics of a storage medium having a real storage area assigned to a positive volume. The host configuration management table 118 is information used for host computer management which employs application data targeted by tier control, described subsequently. The previous tier holding table 119 is information for recovering tiered storage which was assigned to a data set used by a job when the job was previously executed. The storage information table 101 is information relating to the storage apparatus 300 which is managed by the management computer 100. The various tables stored in the memory 110 will be described in detail subsequently.

The I/O processing part 130 is an interface which is connected to the host computer 200 and the storage apparatus 300 via the communication network 500.

Figure 3:
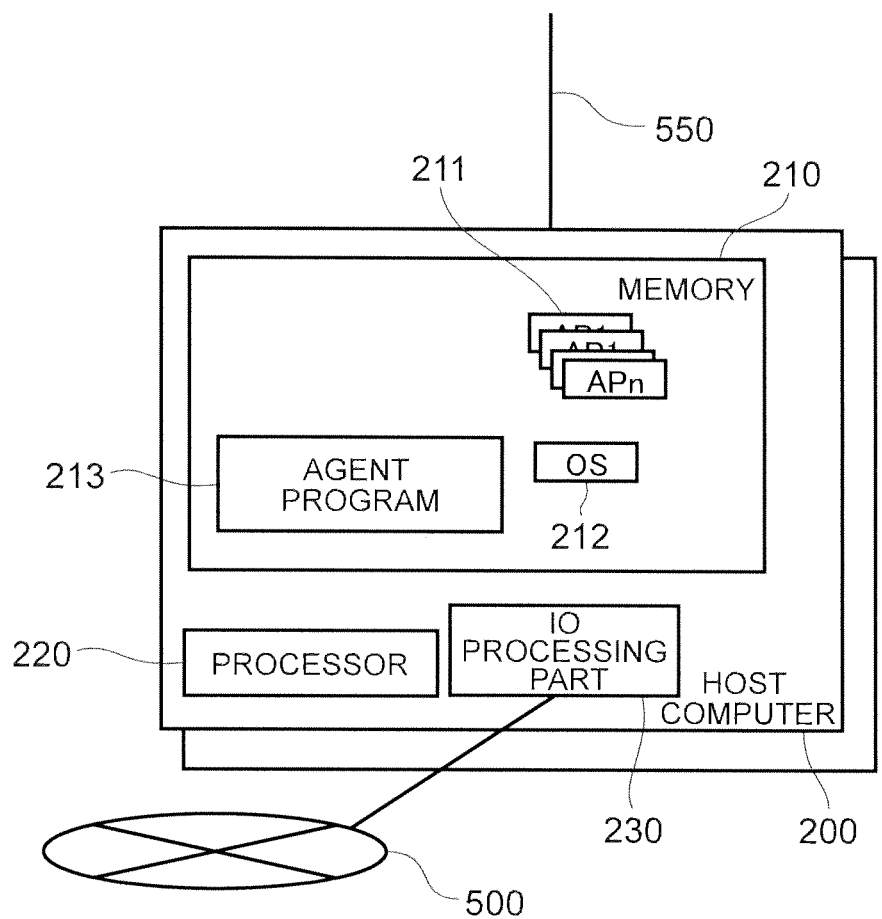
FIG. 3 is a block diagram showing a configuration of a host computer according to this embodiment.

FIG. 3 shows the configuration of the host computer 200. The host computer 200 is a computer which comprises a memory 210, a processor 220, and an I/O processing part 230. The memory 210, the processor 220, and the I/O processing part 230 are interconnected via an internal network (not shown).

The processor 220 performs various processing by executing a program which is stored in the memory 210. For example, the processor 220 accesses data in the logical volumes (real logical volumes, virtual logical volumes) managed by the storage apparatus 300 by transmitting an I/O request to the storage apparatus 300.

The memory 210 stores information and the like which is required by the processor 220 and programs executed by the processor 220. More specifically, the memory 210 stores one or more application programs 211, OS 212, and agent programs 213.

The application program 211 executes various processing. For example, the application program 211 provides a database function or mail server function. The OS 212 controls all of the processing of the host computer 200. The agent program 213 receives instructions from the management computer 100.

The I/O processing part 230 is an interface for communicating with the management computer 100 and the storage apparatus 300 via the communication network 500. More specifically, for example, the I/O processing part 230 transmits I/O requests to the storage apparatus 300.

Figure 4:
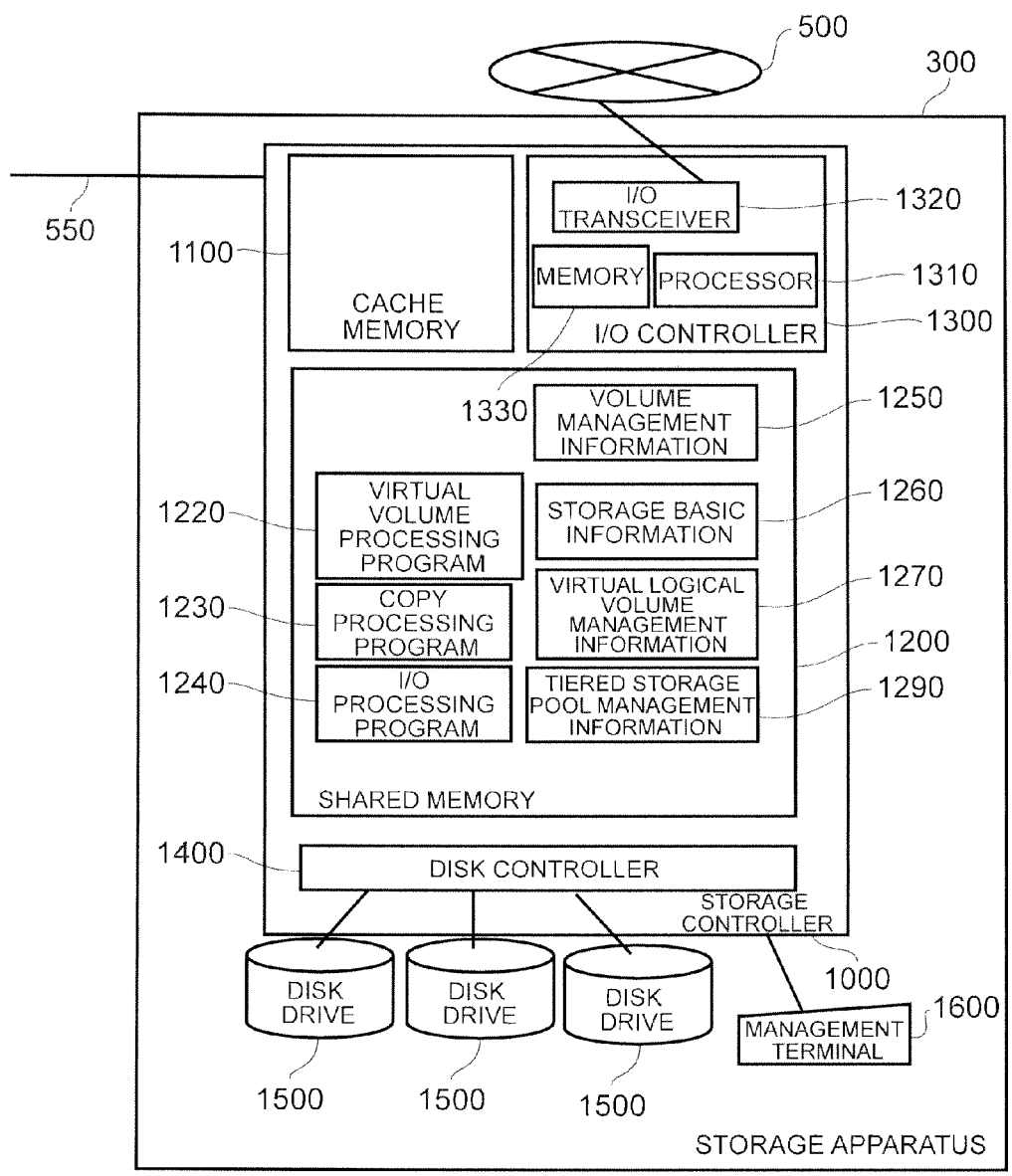
FIG. 4 is a block diagram showing a configuration of a storage apparatus according to this embodiment.

FIG. 4 shows the configuration of the storage apparatus 300. The storage apparatus 300 comprises a storage controller 1000, a plurality of disk drives 1500 and a management terminal 1600. In FIG. 4, the management terminal 1600 is connected directly to the storage controller 1000 in the storage apparatus 300 but may also be connected to the storage apparatus 300 via at least one of the communication networks 500 and 550. The storage controller 1000 and the plurality of disk drives 1500 are interconnected via an internal network.

The disk drives 1500 are disk-type storage media drives and store data which the host computer 200 requires to be written. In addition to the disk drives 1500 or in place of the disk drives 1500, the storage apparatus 300 may comprise storage devices (flash memory drives, for example) with storage media of another type.

The storage controller 1000 controls the operation of the storage apparatus 300. For example, the storage controller 1000 controls writing of data to the disk drives 1500 and reading of data from the disk drives 1500. Furthermore, the storage controller 1000 provides one or more logical volumes to the management computer 100 and the host computer 200. One or more logical volumes are configured from either a real volume or virtual volume. A real volume is one or more logical storage areas which are formed based on a storage space of one or more disk drives 1500. Furthermore, a virtual volume is a virtual volume which uses part of the area of the real volume. The real volume and virtual volume will be described in detail subsequently.

The storage controller 1000 comprises a cache memory 1100, a shared memory 1200, an I/O controller 1300, and a disk controller 1400. The cache memory 1100, the shared memory 1200, the I/O controller 1300, and the disk controller 1400 are interconnected via an internal network (not shown).

The cache memory 1100 temporarily stores the data which is written to the disk drives 1500 and the data which is read from the disk drives 1500. The disk controller 1400 controls writing of data to the disk drives 1500 and reading of data from the disk drives 1500. Further, the disk controller 1400 generates a real volume from the storage space in one or more disk drives 1500.

The I/O controller 1300 comprises a processor 1310, an I/O transceiver 1320, and a memory 1330. The processor 1310, the I/O transceiver 1320, and the memory 1330 are interconnected via the internal network (not shown). The I/O transceiver 1320 is an interface for communicating with other devices (for example, at least one of the management computer 100, the host computer 200, and another storage apparatus 300) via the communication network 500. More specifically, for example, the I/O transceiver 1320 receives an I/O request from the management computer 100 or the host computer 200. Furthermore, the I/O transceiver 1320 transmits data which is read from the disk drives 1500 to the management computer 100 or the host computer 200. The processor 1310 performs various processing by executing a program stored in the memory 1330 or the shared memory 1200. More specifically, for example, the processor 1310 processes I/O requests which are received by the I/O transceiver 1320. The memory 1330 stores information or the like which is required by the processor 1310 and by the program executed by the processor 1310.

The shared memory 1200 stores information or the like which is required by the processor 1310 and the program executed by the processor 1310. Further, the shared memory 1200 stores information or the like which is required by the disk controller 1400 and the program executed by the disk controller 1400. More specifically, for example, the shared memory 1200 stores a virtual volume processing program 1220, an I/O processing program 1240, volume management information 1250, virtual logical volume management information 1270, and tiered storage pool management information 1290.

The virtual volume processing program 1220 is a program which executes processing on virtual volumes. The copy processing program 1230 is a program for performing local copy. The I/O processing program 1240 is a program for processing I/O requests received by the I/O transceiver 1320.

The volume management information 1250 is information for managing logical volumes which are provided by the storage apparatus 300. The virtual logical volume management information 1270 is information mapping assigned areas of real volumes (real storage areas) to virtual storage areas of virtual logical volumes. The tiered storage pool management information 1290 is information for managing logical volumes which are assignable to virtual logical volumes. Various management information which is stored in the shared memory 1200 will be described subsequently in detail.

The management terminal 1600 is a computer which comprises a processor, a memory, and an interface (not shown). The management terminal 1600 transmits information which is entered by the system user (user) to the storage controller 1000 of the storage apparatus 300.

(1-3) Summary of Computer System Processing

A summary of the processing of the computer system 10 will be described next with reference to FIG. 5. First, the relationship between the logical volumes, the real logical volumes, and the virtual logical volumes which form the premise of this embodiment will be described.

Figure 5:
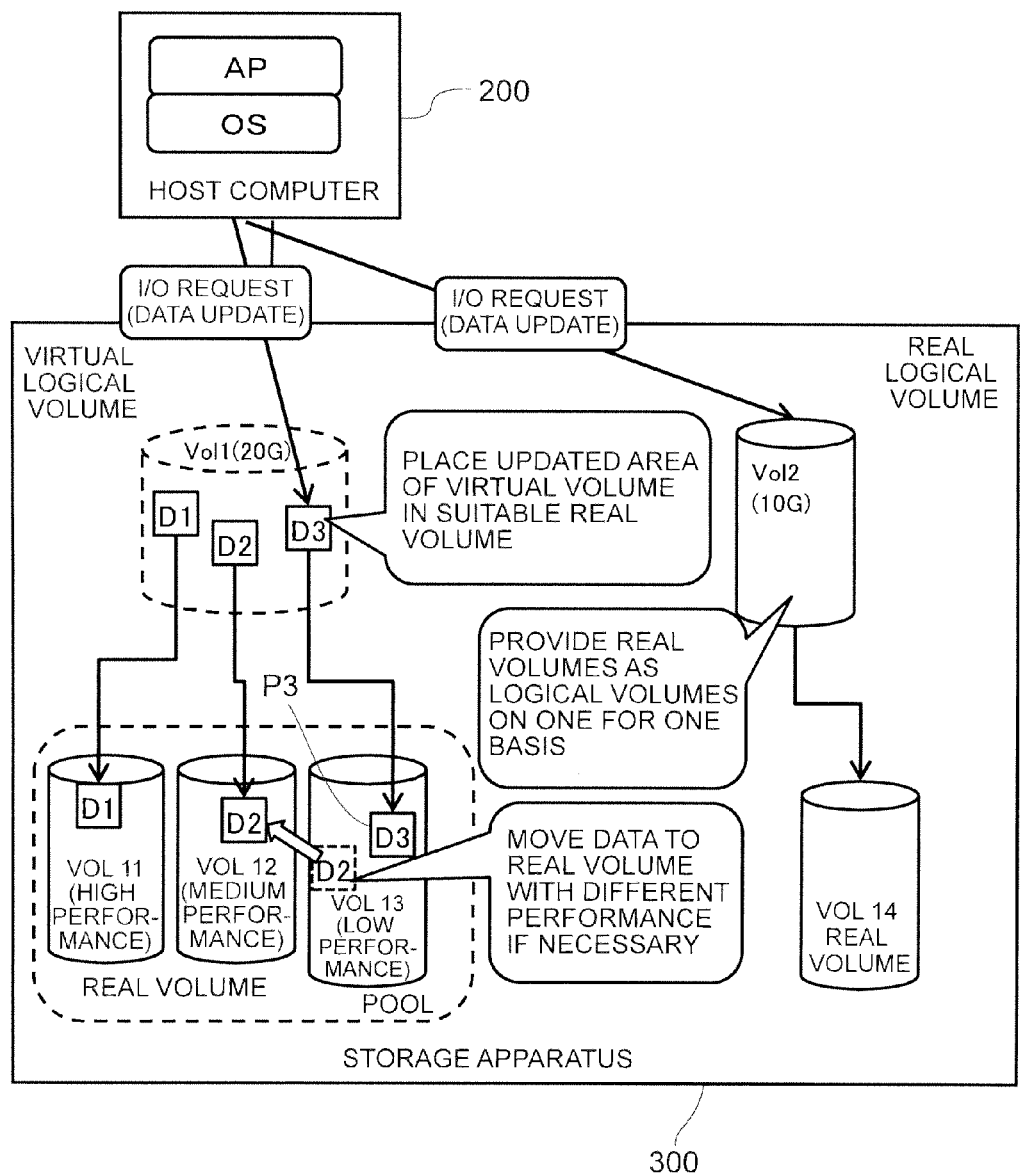
FIG. 5 is a conceptual diagram providing an overview of the processing of the computer system according to this embodiment.

FIG. 5 shows the operation of the storage apparatus 300 when the storage apparatus 300 provides two logical volumes of 20 GB and 10 GB to the host computer 200. A logical volume is configured from either a real volume or a virtual volume. In order to distinguish between a real volume and a virtual volume in this embodiment, a logical volume which is configured from a real volume will be termed a real logical volume in the description hereinbelow and a logical volume which is configured from a virtual volume will be termed a virtual logical volume.

In FIG. 5, Vol2 corresponds to a real logical volume and Vol1 corresponds to a virtual logical volume. A real volume is one or more logical storage areas which are formed from the storage area of one or more disk drives 1500. The storage apparatus 300 according to this embodiment comprises a real volume with a plurality of different characteristics. A different in characteristics means, for example, a difference in the storage elements, namely, a semiconductor drive (for example an SSD: Solid State Drive) or a magnetic drive (for example an HDD: Hard Disk Drive) or the like, a difference in the interface such as FC, SAS, SATA, or a difference in the method (RAID level or the like) for forming the storage areas from the disk drives. Due to this difference in characteristics, there is a difference in the time required to read and write data and in the likelihood of recovery from a hardware fault.

Here, RAID is an abbreviation for Redundant Array of Inexpensive Disks. Further, the RAID level is a classification of the reliability and performance of the real volumes. RAID levels are classified by the data recording method. More specifically, RAID levels are classified according to differences in that data fragments are dispersed between and held with redundancy on a plurality of disk drives 1500 by dividing and replicating the data written from the host computer 200, and data such as parities required to recover the data is generated and held simultaneously together with the data of the host computer 200.

The virtual logical volume is a virtual volume which saves, to a real volume, only data corresponding to an updated area of the virtual logical volume. In FIG. 5, as an example, a data element D3 is stored in a single area of the virtual logical volume (Vol1)) by way of a data I/O request from the host computer 200. In reality, the data element D3 is stored in a fragment (P3) of a storage area of a real volume assigned to the area (data element D3). Thus, a "storage area fragment" which is read from and written to a virtual logical volume and assigned to a real volume will subsequently be called a "page" and data which is stored on a page (in other words, data which is stored in a virtual area to which the page is assigned) will subsequently be called a "data element."

In FIG. 5, page P3 is provided by a real volume (Vol13). Furthermore, in order to distinguish a real volume, which is used for a real logical volume normally accessed by a host computer 200, from a real volume which is used for a virtual logical volume, the real volumes used for a virtual logical volume are registered and managed in a special group (hereinafter called a "pool") in the storage apparatus 300. One or more real volumes with different characteristics are registered in a pool together with characteristic information.

Furthermore, within the virtual logical volumes in the storage apparatus 300, data elements on pages are moved between real volumes with different characteristics in the pool based on the real volume characteristic information. Such processing will be described hereinbelow and referred to as tiered storage control. Furthermore, processing to move data elements on pages between the real volumes will be referred to simply as page movement.

An operation example of tiered storage control will now be described with reference to FIG. 5. Suppose that, in the storage apparatus 300, the difference in the response time for data reading and writing by the host computer 200 is managed as characteristic information (in FIG. 5, high performance and medium performance). Here, if it is determined that the data access frequency of access to a page D2 by the host computer 200 is high in comparison with previously, the storage apparatus 300 moves page D2 from a low performance real volume (Vol11) to a medium performance real volume (Vol12). By performing this page movement, the storage apparatus 300 is able to provide a logical volume with a suitable performance according to the frequency with which the host computer 200 accesses the data.

As described earlier, in tiered storage control, page movement between real volumes with different characteristics within a pool is performed. Note that, in this embodiment, the difference in the characteristics of real volumes, which is key to page movement in tiered storage control is termed a "tier" difference. Further, unless otherwise noted, three tiers are described in the embodiment of the present invention. However, the embodiment of the present invention is not limited to three tiers.

An overview of tiered storage control based on the priority level and characteristics of applications according to the embodiment will be described next with reference to FIGS. 6A and 6B.

Figure 6A:
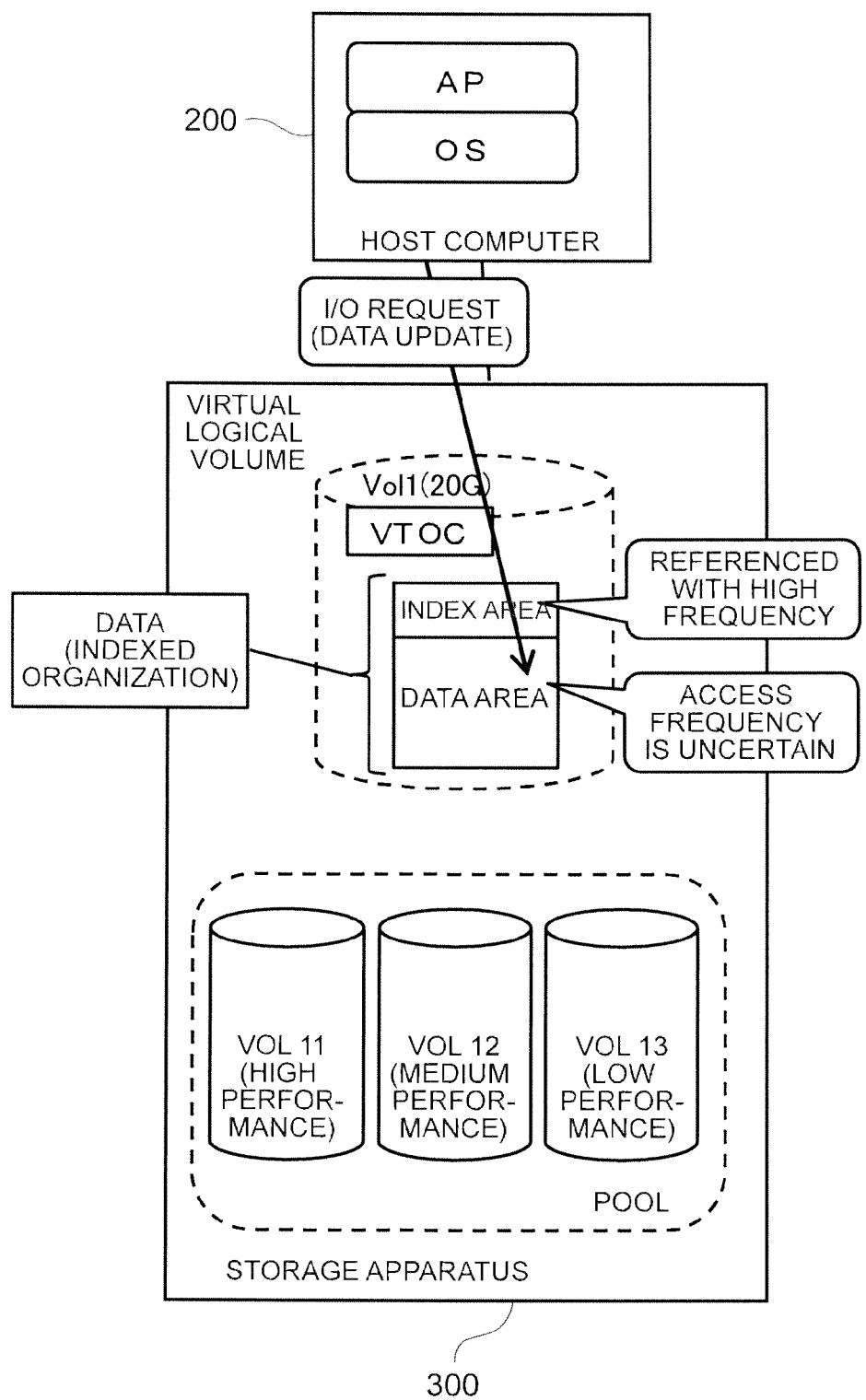
FIG. 6A is a conceptual diagram providing an overview of tiered storage control according to this embodiment.
Figure 6B:
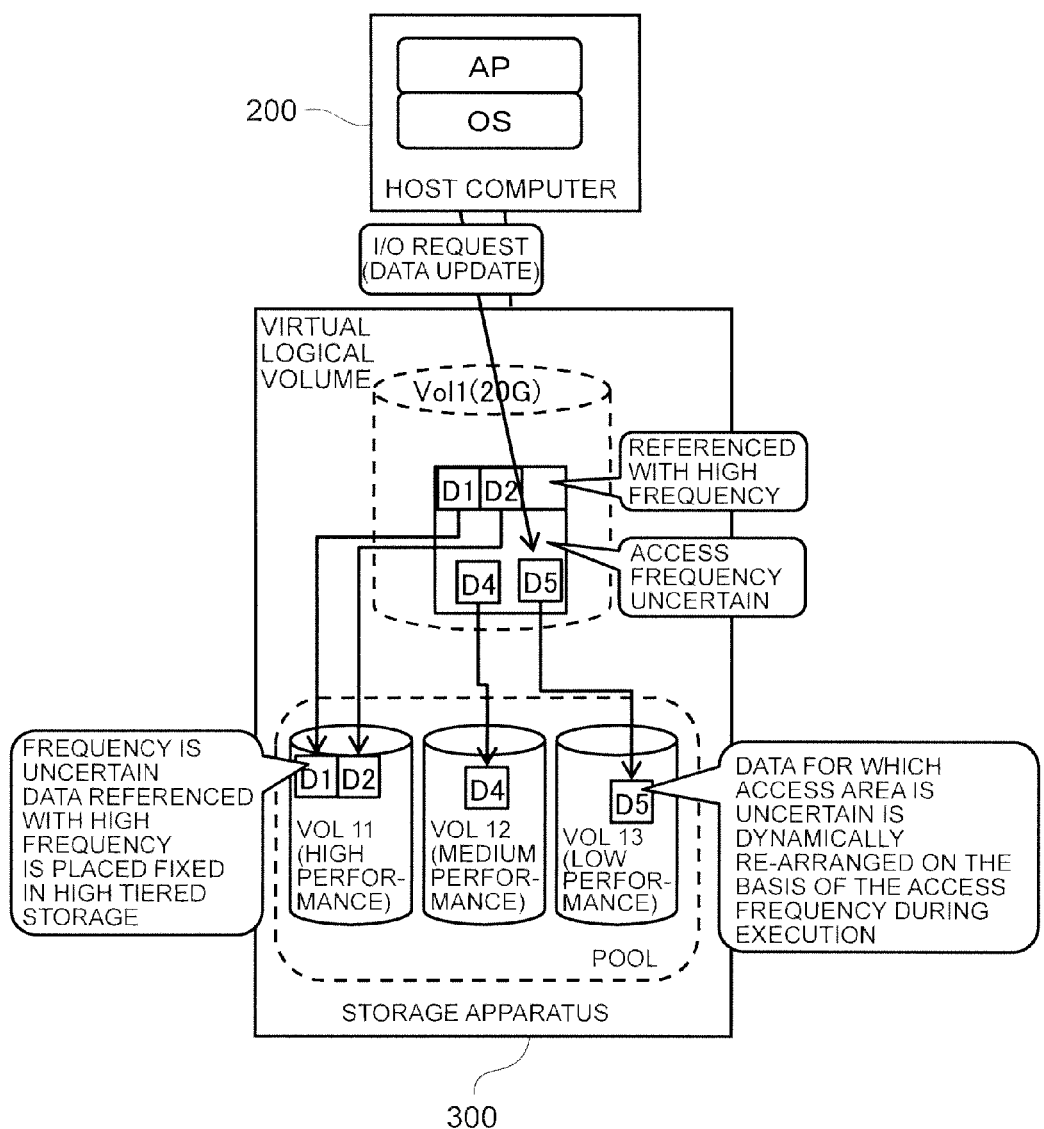
FIG. 6B is a conceptual diagram providing an overview of tiered storage control according to this embodiment.

FIG. 6A is a conceptual diagram showing data referencing processing of the storage apparatus 300 by the host computer 200. Further, FIG. 6B is a conceptual diagram showing how the data referenced by the host computer 200 is placed in the storage apparatus 300.

The host computer 200 operates as follows if data disposed in a logical volume in the storage apparatus 300 which is required by an application is referenced.

As shown in FIG. 6A, the host computer 200 acquires file organization information prescribing how reference target data is to be placed in a particular configuration from a specific area of the OS or volume (VTOC: Volume Table of Contents or the like).

The host computer 200 subsequently starts data access on the basis of information which is obtained from the OS or VTOC. Here, file organization includes indexed organization, sequential organization, partitioned organization, virtual storage access organization, and direct organization and the like, and a suitable organization is selected according to the data referencing characteristics of the applications. In other words, the data referencing characteristics of an application can be predicted to a certain degree with knowledge of the file organization.

In FIG. 6A, a case where the file organization is indexed organization is shown as an example of the data referencing characteristic. With indexed organization, data is divided into an index area and a data area. The index area saves one or more addresses where fragments (records) of logically partitioned data are disposed. The data area saves the actual data fragments. In FIG. 6A, the host computer 200 first references the index area and acquires the address where the target record is disposed. The host computer 200 subsequently designates the acquired address and references the target record.

If data in a logical volume is referenced in an indexed organization in this way, the index area must be referenced by the host computer 200, whereupon an optional object record is referenced. That is, in the case of indexed organization, the index area in particular in the data is referenced highly frequently. Meanwhile, with indexed organization, the record required by the application for the data area is optionally referenced and it is therefore uncertain which part (record) of the data area is referenced highly frequently.

Since the data file organization is indexed organization, the index area which is referenced highly frequently can preferably be referenced at high speed. Hence, as shown in FIG. 6B, data in the index area is assigned to upper tiered storage so that page movement is not induced by the subsequent tier control. Processing in which pages are not moved by the tier control after page movement will be described hereinbelow as a page lock. Meanwhile, the frequency of referencing data in the data area is based on the application operation and difficult to specify statically, and hence [data] is placed according to the conventional tiered storage control processing. In other words, for the data in the data area, suitable performance is realized by way of page movement which is based on the frequency with which data is referenced following data placement.

In the tiered storage control based on the application priority level and characteristics according to this embodiment, the frequencies of referencing data parts which can be statically determined are specified from the data file organization. The data in areas with a high referencing frequency is then assigned to upper tiered storage and the data elements are page-locked. By executing this processing, if it is clear beforehand, for a high priority application, that high I/O processing performance is required, control can be exercised so that data areas with a high referencing frequency in particular can be referenced at high speed.

(1-4) Content of Various Tables

FIG. 7 is a table showing the content of the job in progress management table 112 which is stored in the memory 110 of the management computer 100. The job in progress management table 112 is a table for managing jobs in progress and, as shown in FIG. 7, is configured from a job name field 11201, a data set name field 11202, a control area field 11203, a priority level field 11204, and a start time field 11205.

The job name field 11201 stores the names of jobs which are used when an OS running on the host computer 200 executes an application. The data set name field 11202 stores the names of data sets which are used by the application started up by the jobs in the job name field 11201. The control area field 11203 stores information relating to areas in the logical volume which are targets for tier control by the management computer 100. For example, a start cylinder, a header, a last cylinder or a header or the like, are stored [in this field]. The priority level field 11204 stores priority level information in the case of tier control. The start time field 11205 stores times when jobs are executed.

FIG. 8 is a table showing the content of the control target data management table 113 which is stored in the memory 110 of the management computer 100. The control target data management table 113 is information relating to the data used by the jobs and, as shown in FIG. 8, is configured from a data set name field 11301, a device ID field 11302, a storage address (storage ADR) field 11303, a file organization field 11304, a file organization detail field 11305, and a previous tier pointer field 11306.

The data set name field 11301 stores the names of data sets which are the logical units managed by the mainframe OS in particular and which are data which is used by applications running mainly on the host computer 200. In an open system, for example, file names correspond to data set names. The device ID field 11302 stores identifiers (device numbers or the like, for example) enabling the OS on the host computer 200 to uniquely identify the logical volumes in which the data sets are disposed. The storage address (storage ADR) 11303 field stores the addresses for the device IDs stored in the data sets. More specifically, the addresses in the device ID field 1183 in the host configuration management table 118, described subsequently, are stored in the device ID field 11302. For example, the start cylinder of the data set, the header count, and the last cylinder and header count are stored [in this field]. In a case where the communication network 500 is an SCSI (Small Computer System Interface), such addresses may be LBAs (Logical Block Addresses). The file organization field 11304 stores the names of the file organization configured in data sets. The file organization detail field 11305 stores information on the areas targeted for file organization-based tiered storage control. This information is represented by a start cylinder, a header, a last cylinder and a header, for example. The previous tier pointer field 11306 stores pointers for referencing the previous tier holding table 119, described subsequently. As described subsequently, the previous tier holding table 119 is a table for managing information for recovering tiered storage which is assigned to a data set used by a job when the job has been previously executed.

FIG. 9 is a table showing the content of the user configuration information management table 114 which is stored in the memory 110 of the management computer 100. The user configuration information management table 114 is information which relates to control target data and which is configured beforehand by the user of the computer system 10 and, as shown in FIG. 9, is configured from an item priority level field 11401, an item field 11402, a configuration content field 11403, and a tiered storage priority level field 11404.

The item priority level field 11401 stores priorities of a plurality of items which are configured by the user of the management computer 100 in an initial configuration, described subsequently. The item field 11402 stores items designated by the user. Examples of items include the time, job name, job class, data set name, user name and so on. The configuration content 11403 field stores the content of the designated item 11402. For example, in the case of the time, the time range T3 to T4 is designated. The tiered storage priority level 11404 field stores information indicating whether the data sets corresponding to the items designated by the user have a high priority.

FIG. 10 is a table showing the content of an I/O frequency management table 115 which is stored in the memory 110 of the management computer 100. The I/O frequency management table 115 is information relating to application referencing characteristics and, as shown in FIG. 10, is configured from a file organization field 11501, a high frequency I/O 1 field 11502, a high frequency I/O 2 field 11503, and an acquisition method field 11504.

The file organization field 11501 stores names of file organizations which are configured in control target data sets. The high frequency I/O 1 field 11502 stores information on the areas in which data is referenced with the highest frequency for that file organization. The high frequency I/O 2 field 11502 stores information on areas in which data is referenced with the next highest frequency after that in the high frequency I/O 1 for that file organization.

Here, the file organization is described in terms of information which is configured for the high frequency I/O fields 1 and 2 in the case of the virtual storage access organization (also known as VSAM). The virtual storage access organization is a file organization which is used in a database which is an application required by a high I/O performance. In the data referencing of this organization, a high I/O performance is required for the whole data set, and, within the data set, a high I/O performance is required for the index area in particular. Hence, index is registered in the high frequency I/O 1 and the whole data set is registered in the high frequency I/O 2. The acquisition method 11504 field stores information on the means (OS utility1) which is required to acquire an area in the logical volume of the high frequency I/O area.

FIG. 11 is a table showing the content of the tiered storage usage status management table 116 which is stored in the memory 110 of the management computer 100. The tiered storage usage status management table 116 is information for holding information relating to the usage status of the tiered storage such as a tier number field 11601, a full capacity field 11602, an unused capacity field 11603, a page locked capacity (high priority) field 11604, and a page locked capacity (low priority) field 11605.

The tier number field 11601 stores the numbers of tiered storage, described subsequently. For example, in this embodiment, the smaller the value of the tier number 11601, the higher the performance of the tiered storage. The full capacity field 11602 stores information on the full capacity of the tiered storage corresponding to the tier number in the storage apparatus 300. The unused capacity field 11603 stores information on the capacity which is not yet a tier control target in the tiered storage. The page locked capacity field 116 stores information on the area over which the page lock control used in this embodiment is exercised; the capacity of tiered storage which is assigned for the highest priority job is stored in the high priority field 11604 and the capacity of tiered storage which is assigned for the lowest priority job is stored in the low priority field 11605.

Figure 12:
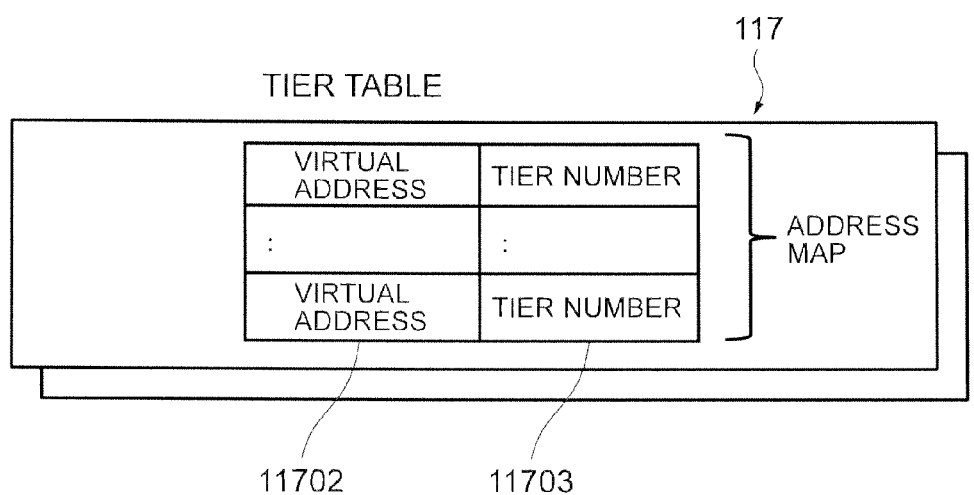
FIG. 12 is a table showing the content of a tiered table according to this embodiment.

FIG. 12 is a table showing the content of the tier table 117 which is stored in the memory 110 of the management computer 100. The tier table 117 is configured from a plurality of address maps, and the address maps are configured from a virtual address field 11702 and a tier number field 11703. The virtual address field 11702 stores information indicating virtual volume areas. The tier number field 11703 stores the numbers of tiered storage, described subsequently.

FIG. 13 is a table showing the content of a host configuration management table 118 which is stored in the memory 110 of the management computer 100. The host configuration management table 118 is a table for managing a host computer 200 which uses application data targeted for tier control and, as shown in FIG. 13, is configured from a host ID field 1181, a data set name field 1182, a storage device field ID 1183, a storage address (storage ADR) field 1184, a storage ID field 1185, and a volume ID field 1186.

The host ID 1181 field stores identifiers for identifying the host computer 200. For example, the host ID 1181 field stores combinations of a TCP/IP host name and an IP address. The data set name field 1182 stores the names of data sets which are logical units managed by a mainframe OS in particular and which are data used by applications mainly running on the host computer 200. For example, in an open system, file names correspond to data sets. The storage device ID field 1183 stores identifiers (device numbers and the like, for example) enabling the OS on the host computer 200 to uniquely identify logical volumes in which the data sets are disposed. The storage address 1184 field stores addresses which correspond to the storage device ID 1183 field where corresponding data sets are disposed. For example, the start cylinder of the data set, the header count, and the last cylinder and header count area stored [in this field]. In the case of an SCSI, such addresses may be LBAs (Logical Block Addresses). The storage ID field 1185 stores identifiers for identifying the storage apparatuses 300 managed by the management computer 100. The volume ID field 1186 stores identifiers for identifying logical volumes to which the storage apparatuses 300 identified by the storage ID field 1185 are assigned.

Figure 14:
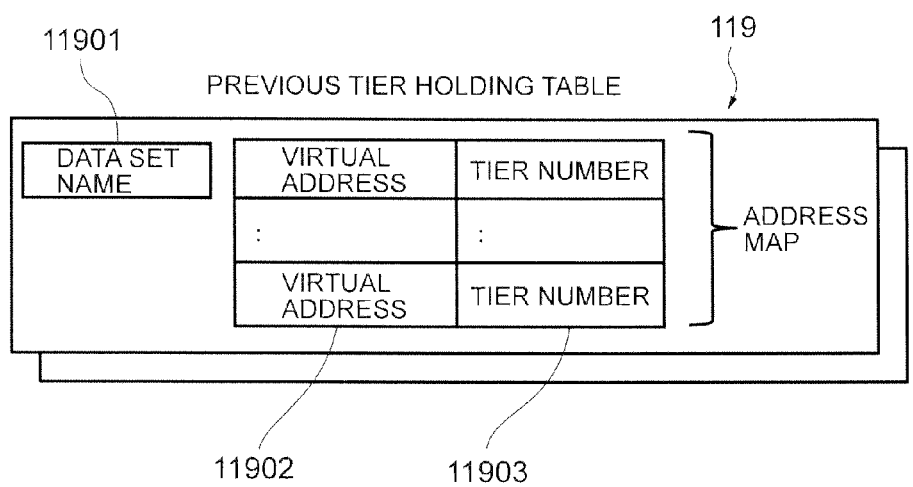
FIG. 14 is a table showing the content of a previous tier holding table according to this embodiment.

FIG. 14 is a table showing the content of the previous tier holding table 119 stored in the memory 110 of the management computer 100. The previous tier holding table 119 is a table for managing which volume the designated logical volume is disposed in by the tiered storage control and, as shown in FIG. 14, is configured from the data set name field 11901 and an address map and the address map is configured from a virtual address field 11902 and a tier number field 11903.

The data set name field 11901 stores the names of data sets which are logical units managed by the mainframe OS in particular and which are data used by applications mainly running on the host computer 200. The virtual address field 11902 stores identifiers enabling the storage apparatus 300 to identify the virtual volume. The tier number field 11903 stores tiered storage numbers which will be described subsequently.

Figure 15:
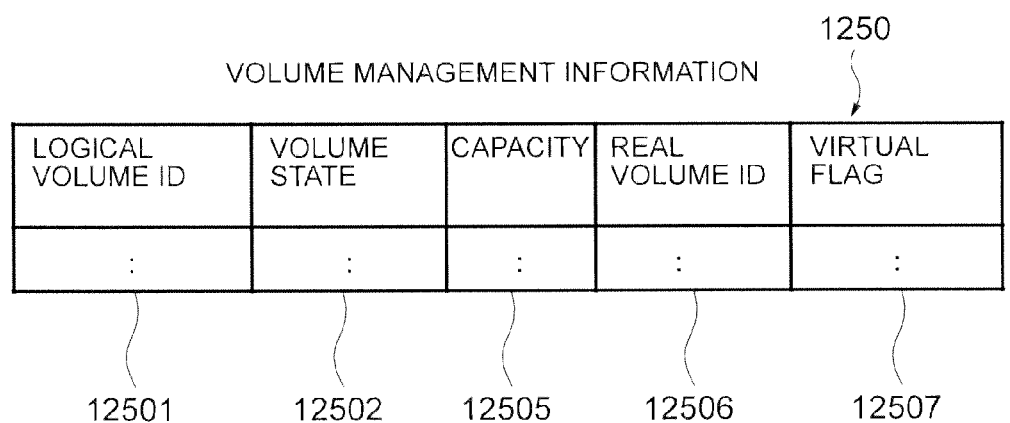
FIG. 15 is a table showing the content of volume management information according to this embodiment.

FIG. 15 is a table showing the content of volume management information 1250 which is stored in the shared memory 1200 of the storage apparatus 300. The volume management information 1250 is information for managing logical volumes and, as shown in FIG. 15, is configured from a logical volume ID field 12501, a volume state field 12502, a capacity field 12503, a real volume ID field 12506, and a virtual flag field 12507.

The logical volume ID field 12501 stores identifiers for identifying logical volumes which are provided by the storage apparatus 300 storing the volume management information 1250. The volume state field 12502 stores information indicating the current state of the logical volume identified by the logical volume ID 1250. For example, the volume state field 12502 stores at least one of the information items indicating normal, abnormal, or unmounted. More specifically, for example, if the host computer 200 is able to normally access the logical volume identified by the logical volume ID, the volume state information field 12502 stores information indicating "normal." Further, if the host computer 200 is unable to normally access logical volumes identified by the logical volume ID, the volume state information field 12502 stores information indicating "abnormal." For example, when the disk drive 1500 fails or when copy failure occurs, the volume state information field 12502 stores information indicating "abnormal." Further, if data is not stored in the logical volume identified by the logical volume ID, the volume state information field 12502 stores information indicating "unmounted."

The capacity field 12503 stores the capacity (storage capacity) of the logical volumes identified by the logical volume ID. The real volume ID field 12506 stores identifiers identifying real volumes which are associated with the logical volumes corresponding to the logical volume ID. The virtual flag field 12507 stores information indicating whether a logical volume is configured from a virtual volume. If the virtual flag is 1, this indicates that the logical volume is a virtual logical volume. Further, if the virtual flag is 0, this means that the logical volume is a real logical volume.

Figure 16:
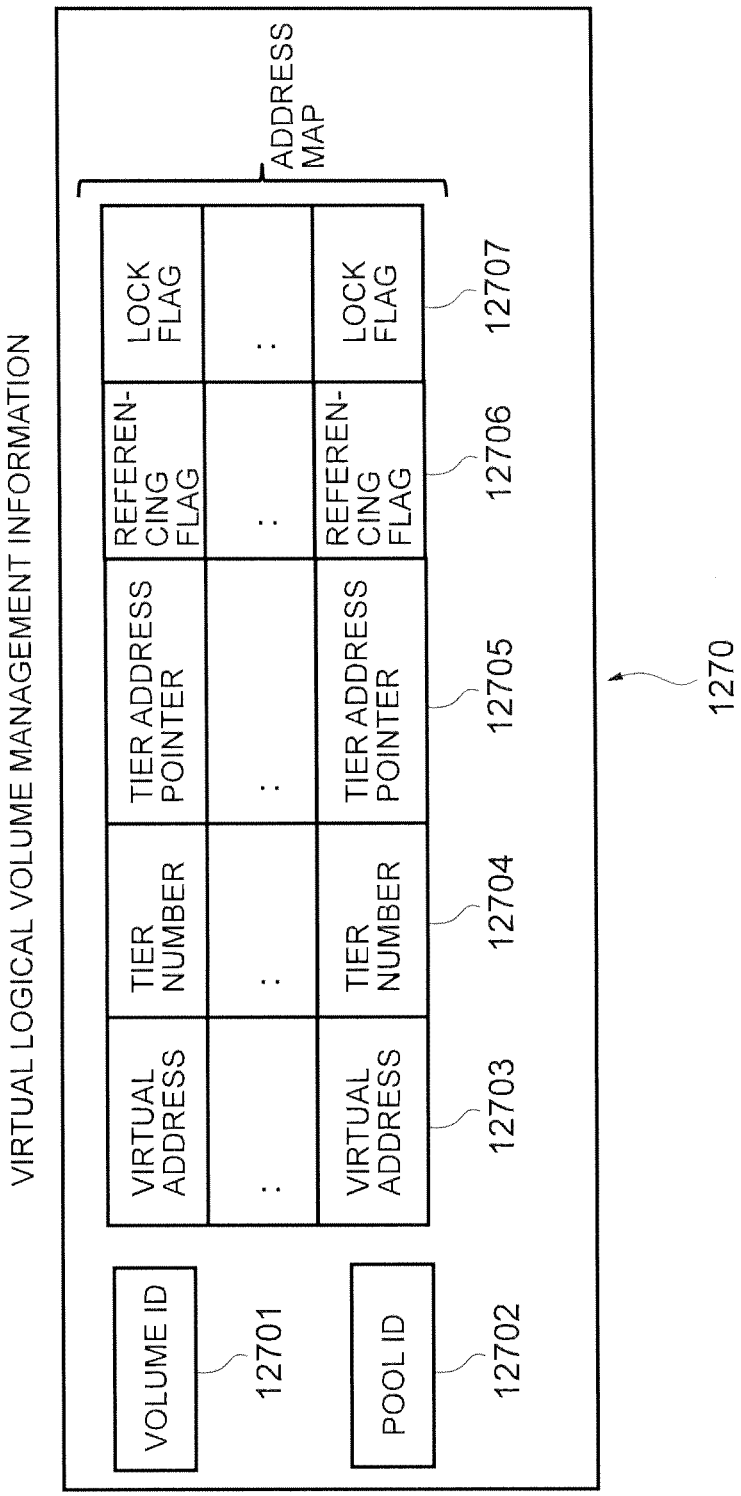
FIG. 16 is a table showing the content of virtual logical volume management information according to this embodiment.

FIG. 16 is a table showing the content of the virtual logical volume management information 1270 which is stored in the storage apparatus 300. The virtual logical volume management information 1270 is information for managing the virtual logical volumes and the number in the virtual logical volume management information 1270 is the same as the number of virtual logical volumes held by the storage apparatus 300. That is, a single virtual logical volume management information item 1270 is created for one virtual logical volume. The virtual logical volume management information 1270 is, as shown in FIG. 16, configured from a volume ID field 12701, a pool ID field 12702, and an address map (12703, 12704, 12705, 12706, and 12707). Hereinbelow, the storage apparatus 300 which stores the virtual logical volume management information 1270 is referred to as the "storage apparatus 300" and the virtual logical volume corresponding to the virtual logical volume management information 1270 is called the "virtual logical volume."

The volume ID field 12701 stores identifiers of the real volumes identified by the storage apparatus 300. The pool ID field 12702 stores identifiers identifying the tiered storage pool management information 1290 managed by the storage apparatus 300. The pool ID stored in the pool ID field 12702 is used to specify the real volume group providing pages to the virtual logical volume.

The address map is configured from a virtual address field 12703, a tier number field 12704, a tier address pointer field 12705, a referencing flag field 12706, and a lock flag field 12707. The virtual address field 12703 stores addresses indicating single-unit virtual areas of the virtual logical volumes. The size of a single unit of the virtual areas is the same size as the page size. If a virtual logical volume is designated in an I/O request from the host computer 200, a virtual address representing the virtual area which is the address destination in the virtual logical volume is also designated. The tier number field 12704 stores a number indicating a specific tiered storage in the tiered storage pool management information 1290 indicated by the pool ID. The tier address pointer field 12705 stores pointers indicating an area of the tiered storage address map of the specific tier in the tiered storage pool management information 1290 indicated by the pool ID 12703. That is, the tiered storage pool management information 1290 contains several tiers and a tiered storage address map is associated with each tier. Further, the tiered storage address maps provide linear storage areas, and the tier number in the tier number field 1270 and the tier address pointer in the tier address pointer field 12705 designate a tier number in the pool as well as a single address in the tiered storage address map which is provided for each of the tier numbers. Note that if a page has not been assigned to the virtual area, the tier address pointer 12705 corresponding to the virtual address 12703 of the virtual area stores information indicating "unused." The referencing flag 12706 stores a flag indicating that there has been writing or a write referencing to the area (page) indicated by the virtual address. The lock flag field 12707 stores a flag indicating that an area (page) indicated by the virtual address is under the aforementioned page lock control.

Figure 17:
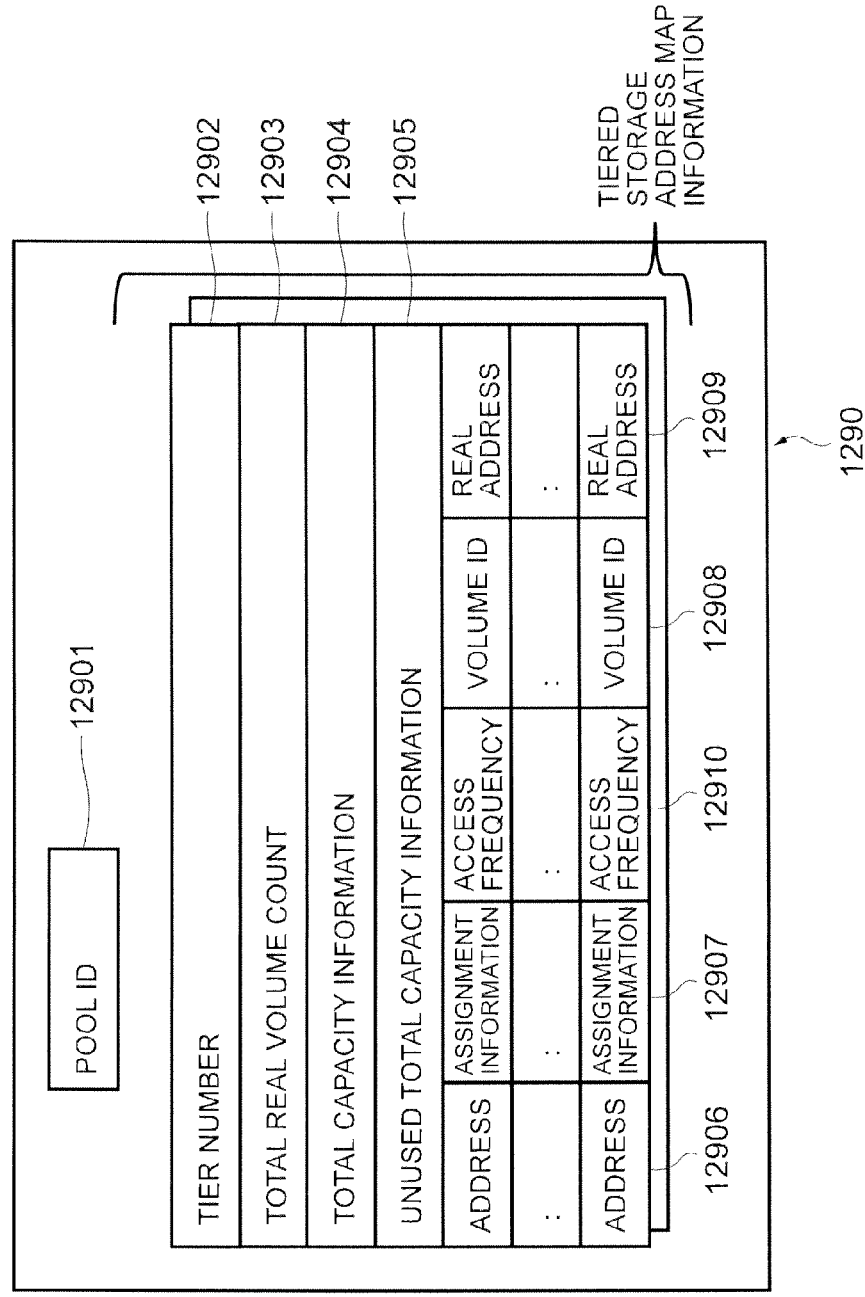
FIG. 17 is a table showing the content of tiered storage pool management information according to this embodiment.

FIG. 17 is a table showing the content of the tiered storage pool management information 1290 stored in the shared memory 1200 of the storage apparatus 300. The tiered storage pool management information 1290 is information for managing pools and the number of tiered storage pool management information items 1290 is the same number as the number of pools in the storage apparatus 300. That is, one tiered storage pool management information 1290 is created for a single pool. The tiered storage pool management information 1290 is configured from a pool ID 12901 and tiered storage address map information (12902 to 12910). The pools which correspond to the tiered storage pool management information 1290 are referred to hereinbelow as "the pools." The pool ID 12901 is an identifier uniquely identifying the pools. The tiered storage address map information is information for managing one or more real volumes which are assigned to one or more tiers in the pools. The tiered storage address map information is information exists in quantity corresponding to the number of tiers registered in the pools and the storage areas of each tier can each be referenced using a linear address.

The tiered storage address map information is configured from a tier number field 12902, a total real volume count field 12903, a total capacity information field 12904, an unused total capacity information field 12905, an address field 12906, an assignment information field 12907, an access frequency field 12910, a volume ID field 12908, and a real address field 12909. Real volumes corresponding to the tiered storage address map information are referred to hereinbelow as "the real volumes."

The tier number field 12902 stores numbers representing the tiers of tiered storage. The total real volume count field 12903 stores the number of real volumes registered in the tier indicated by the tier number. The total capacity information field 12904 stores the total capacity of real volumes registered in the tier indicated by the tier number. The unused total capacity field 12905 stores the total capacity of the unused area to which pages have not been assigned in the real volumes registered in the tier indicated by the tier number. The address field 12906 stores the addresses of linear address spaces provided by the tiered storage address map. The assignment information field 12907 stores information indicating whether the area corresponding to the address 12906 is assigned, unassigned (that is, unassignable or assignable) or subject to page lock control. The address frequency field 12910 stores information (access frequency) which has been referenced any number of times after the area corresponding to the address 12906 is assigned if this area has been assigned. The volume ID field 12908 stores identifiers uniquely identifying real volumes. The real address field 12909 stores the addresses of real volumes indicated by the real volume IDs.

Figure 18:
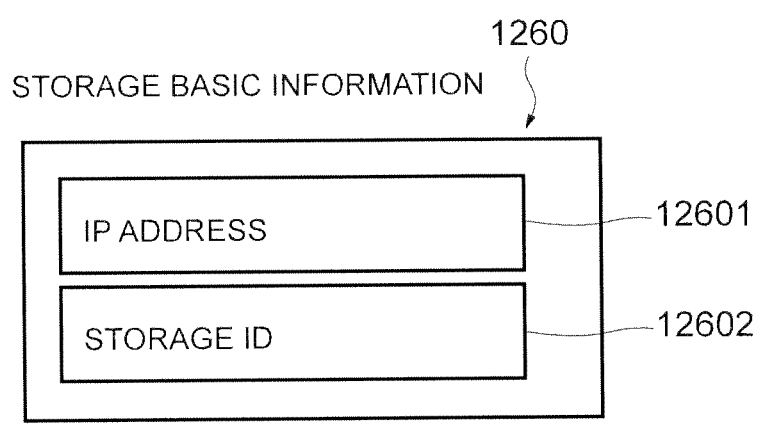
FIG. 18 is a table showing the content of storage basic information according to this embodiment.

FIG. 18 is a table showing the content of the storage basic information 1260 which is stored in the shared memory 1200 of the storage apparatus 300. The storage basic information 1260 is a table for managing information of the storage apparatus 300 and which is configured from an IP address field 12601 and a storage ID 12602. The IP address field 12601 stores IP addresses which are assigned to the storage apparatuses 300. The storage ID field 12602 stores identifiers uniquely identifying the storage apparatuses 300 indicated by the IP addresses.

Figure 19:
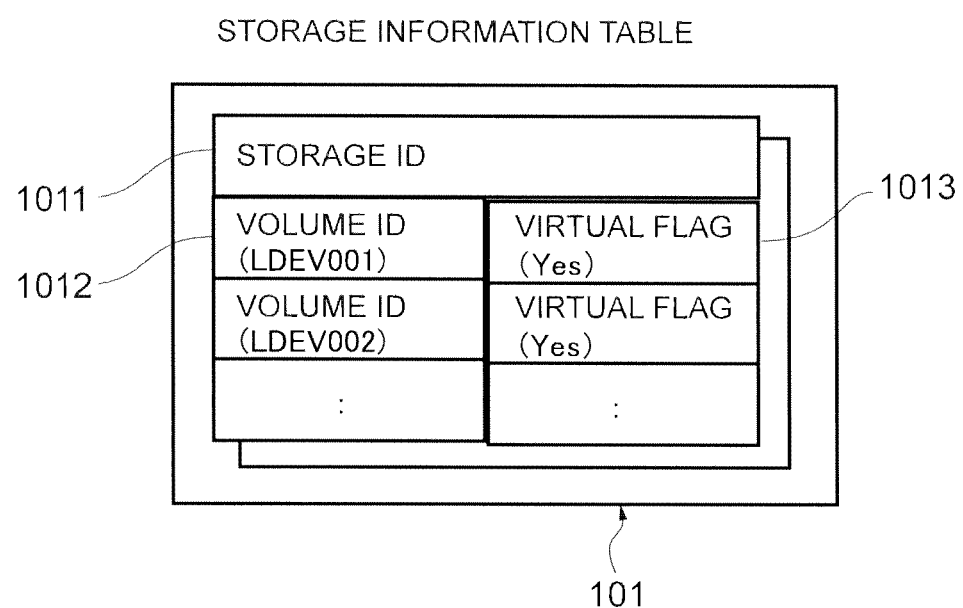
FIG. 19 is a table showing the content of a storage information table according to this embodiment.

FIG. 19 is a table showing the content of the storage information table 101 stored in the management computer 100. The storage information table 101 is configured from a storage ID field 1011, the volume ID field 1012, and a virtual flag field 1013. The storage ID field 1011 stores identifiers uniquely identifying storage apparatuses 300 which are managed by the management computer 100. The volume ID field 1012 stores identifiers for uniquely identifying logical volumes which are assigned by the storage apparatuses 300 identified by the storage IDs. The virtual flag field 1013 stores flags indicating that a volume is a virtual logical volume.

Figure 20:
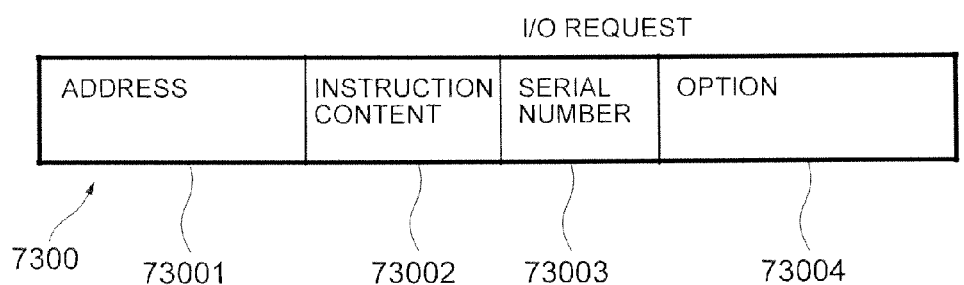
FIG. 20 is a table showing the content of an I/O request according to this embodiment.

FIG. 20 is a table showing the content of an I/O request 7300. The I/O request 7300 is issued by the management computer 100 or the host computer 200. The I/O request 7300 is configured from an address 7301, instruction content 73002, a serial number 73003, and an option 73004.

The address 73001 is information relating to the address of the I/O request 7300, and is information including, for example, an identifier of the storage apparatus 300 which is the transmission destination of the I/O request 7300, an identifier of the logical volume (a virtual logical volume or real logical volume, for example) in the storage apparatus 300, and the address (volume address) of the storage area in the logical volume (virtual area or real area, for example).

The instruction content 73002 is the content of the processing indicated by the I/O request 7300. For example, the instruction content 73002 is a tier control instruction or a data access instruction or the like. Possible examples of tier control include page tier movement, start page lock, release page lock, acquire volume tier state, or acquire pool state, or the like. Furthermore, possible examples of data access instructions include data writing or data reading or the like.

The serial number 73003 indicates the order in which the I/O requests 7300 are issued. The serial number 73003 is determined by the management computer 100 or the host computer 200 which is the source of the I/O request 7300. Possible examples of the option 73004 include the content of data for which writing is requested by the I/O request 7300 and address map information after movement if a page is moved.

Figure 21:
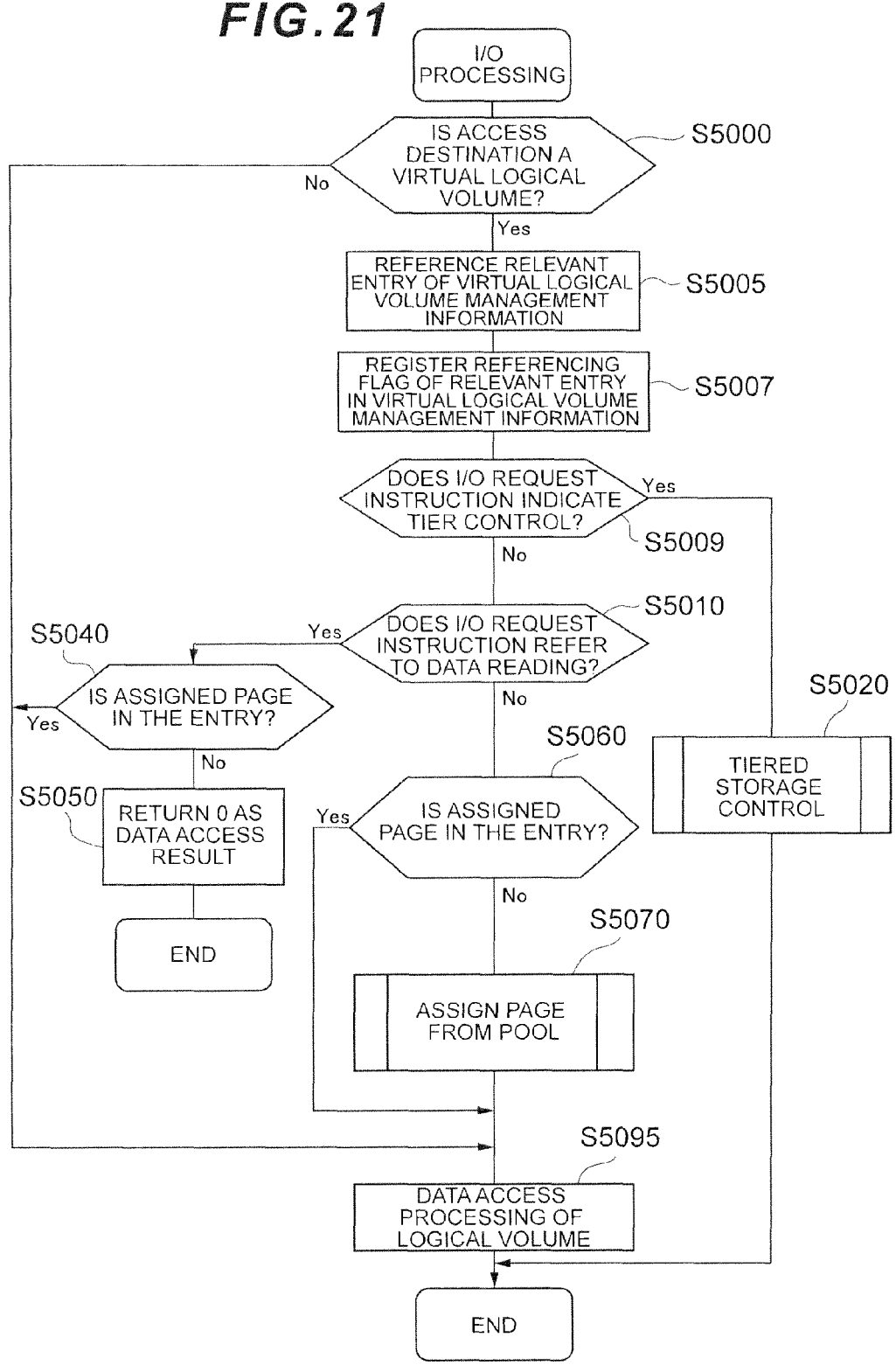
FIG. 21 is a flowchart showing a processing routine for data access processing according to this embodiment.

(1-5) Details of Operation of Each Apparatus (1-5-1) Details of Operation of Storage Apparatus First, the operation of the storage apparatus 300 will be described in detail. FIG. 21 is a flowchart showing a processing routine for data access processing of the storage apparatus 300.

Upon receiving an I/O request 7300 from the host computer 200, the I/O controller 1300 of the storage apparatus 300 determines whether the address 73001 of the I/O request 7300 denotes a virtual logical volume (S5000). More specifically, for example, the processor 1310 (hereinafter described as the I/O controller 1300) of the I/O controller 1300 references the address 73001 of the I/O request 7300 and acquires the volume ID contained in the address 73001. The I/O controller 1300 then acquires information relating to the logical volume which matches the acquired volume ID from the volume management information 1250 shown in FIG. 15.

Further, if the virtual flag 12507 of the volume management information 1250 denotes a virtual logical volume, the I/O controller 1300 executes step S5005 and subsequent steps. If, on the other hand, [the virtual flag 12507] does not denote a virtual logical volume, the I/O controller 1300 executes step S5095 and subsequent steps. The virtual logical volume corresponding to the acquired volume ID will be termed "the virtual logical volume" in the following description of FIGS. 21 and 22.

In step S5005, the I/O controller 1300 references the virtual logical volume corresponding to the acquired volume ID from one or more of the virtual logical volume management information items 1270 shown in FIG. 16. In the following description of FIGS. 21 and 22, the virtual logical volume management information 1270 specified is termed the "virtual logical volume management information 1270."

The I/O controller 1300 specifies the virtual address 12703 which corresponds to the volume address (hereinafter called "the volume address" in the description of FIGS. 21 and 22) contained in the address 73001 of the I/O request 7300 from the virtual logical volume management information 1270. The I/O controller 1300 references virtual address entries corresponding to the specified virtual address 12703. Here, the virtual address entries are information elements (entries) which include the virtual address 12703, the tier number 12704, the tier address pointer 12705, the referencing flag 12706, and the lock flag 12707. The virtual address entries specified by the I/O controller 1300 are termed the virtual address entries hereinbelow.

The I/O controller 1300 then registers a flag indicating that there is a reference in the reference flag 12706 field of the virtual logical volume management information 1270 (S5007).

The I/O controller 1300 determines whether the instruction content 73002 of the I/O request 7300 is a tier control instruction (S5009). If the instruction content 73002 of the I/O request 7300 is a tier control instruction, the I/O controller 1300 executes the tiered storage control processing (S5020), which will be described subsequently, and completes I/O processing. If the instruction content 73002 of the I/O request 7300 is not a tier control, the I/O controller 1300 executes the next step S5010.

The I/O controller 1300 then determines whether the instruction content 73002 of the I/O request 7300 is for a data read reference (S5010). If the instruction content 73002 of the I/O request 7300 is not for a data read reference, the I/O controller 1300 executes the processing of step S5060.

In step S5060, the I/O controller 1300 determines whether there is a page assigned to the virtual address entry (S5060). More specifically, the I/O controller 1300 references the tier address pointer 12705 and determines whether the tier address pointer 12705 is "unused" (no assigned page).

If it is determined in step S5060 that there is a page assigned to the virtual address entry, the I/O controller 1300 executes processing to assign a page from a pool (S5070). The processing to assign a page in step S5070 will be described in detail subsequently.

If it is determined in step S5010 that the instruction content 73002 in the I/O request 7300 is for a data read reference, the I/O controller 1300 determines whether there is a page assigned to the virtual address entry (S5040). More specifically, the I/O controller 1300 references the tier address pointer 12705 to determine whether the tier address pointer 12705 indicates "unused" (no assigned page).

If it is determined in step S5040 that there is a page assigned to the virtual address entry, the I/O controller 1300 configures the data reference result in the I/O request 7300 as 0 (that is, a data element representing 0 is read), the I/O controller 1300 sends back a data element 0 to the host computer 200 (S5050) and ends the data access processing.

After processing to assign a page from the pool in step S5070 or if it is determined that the tier address pointer 12705 indicates "unused" in the determination of step 5060 (if there is an assigned page), the I/O controller 1300 executes step S5095.

If it is determined in step S5040 that the tier address pointer 12705 does not indicate "unused" or if it is determined in step S5000 that the virtual flag 12507 of the volume management information 1250 does not indicate a virtual logical volume, the I/O controller 1300 executes data access processing on the logical volume (virtual logical volume or real logical volume) (S5095).

In the data access processing for the logical volume, if the logical volume indicated by the address 73001 in the I/O request 7300 is a virtual logical volume, the I/O controller 1300 accesses the page specified by the tier address pointer 12705 of the virtual address entry. Furthermore, if the logical volume represented by the address 73001 of the I/O request 7300 is a real logical volume, the I/O controller 1300 accesses the real area specified by the volume address at the address 73001.

An example of the flow of data access processing in the storage apparatus 300 was described hereinabove. Note that, in the description of FIG. 21, the processing performed by the I/O controller 1300 may be executed by the processor 1310 which executes the I/O processing program 1240, for example. The processor 1310 may also cause the virtual volume processing program 1220 to execute virtual volume-related processing.

Figure 22:
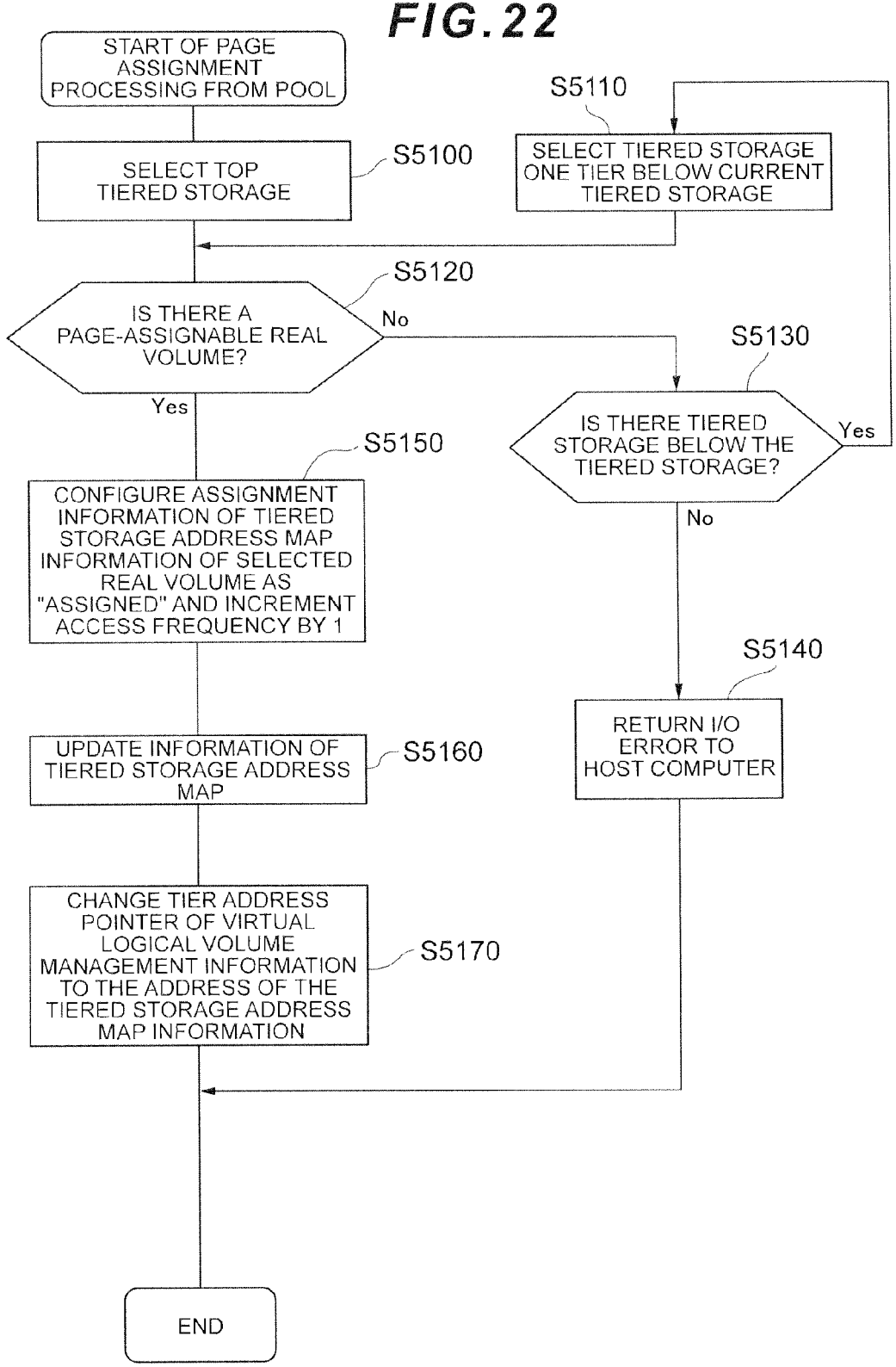
FIG. 22 is a flowchart showing a processing routine for page assignment processing according to this embodiment.

FIG. 22 is a flowchart showing a processing routine for processing for assigning pages from the pools in the storage apparatus 300 which is executed in step S5070 of FIG. 21.

First, the I/O controller 1300 of the storage apparatus 300 references the tiered storage pool management information 1290 indicated by the pool ID 12702 in the virtual logical volume management information 1270 of the virtual logical volume. The I/O controller 1300 then selects the tier with the smallest tier number (the highest tier configured as having the highest performance and reliability) in the one or more tiered storage address map information (S5100).

The I/O controller 1300 determines whether there is an entry "unused" in any of the assignment information 12907 of the tiered storage address map information with that tier number (S5120).

Here, if it is determined in step S5120 that an "unused" entry has been found in any of the assignment information 12907 in the tiered storage address map information (rows in the tiered storage address map information comprising an address 12906, assignment information 12907, a volume ID 12908, a real address 12909), the I/O controller 1300 references the entry information, acquires the volume ID 12908 and the real address 12909, and specifies an access target page. In addition, the I/O controller 1300 assigns the assignment information 12907 of the entry and adds 1 to the value of the access frequency 12910 contained in the information (S5150).

The I/O controller 1300 then updates the information in the tiered storage address map (S5160). More specifically, the I/O controller 1300 subtracts the page capacity required for assignment from the unused total capacity of the unused total capacity information 12905 (S5160).

The I/O controller 1300 then changes the tier address pointer 12705 of the virtual logical volume management information 1270 to the entry. The tier address pointer 12705 is configured from a tier number and an address of the tiered storage pool management information 1290.

If, on the other hand, it is determined in step 5120 that there is no "unused" entry in all the assignment information 12907 of the tiered storage address map information, the I/O controller 1300 checks for the existence of the tiered storage address map information which is one tier below the tier number (current tier number+1) of the tiered storage address map information (S5130).

If the tiered storage address map information one level below exists in step S5130, the I/O controller 1300 selects tiered storage address map information which is one tier below the current tier (current tier number+1) (S5110), and re-executes step S5120.

If, in step S5130, the tiered storage address map information one tier below does not exist, the I/O controller 1300 returns an I/O error to the host computer 200 which issued the I/O request (S5140). In step S5140, the I/O controller 1300 may not only return an I/O error to the host computer 200 with the I/O error but also issue notification of the I/O error to the user via the management terminal 1600 or mail.

An example of the flow of the page assignment processing according to the storage apparatus 300 was described hereinabove. Note that, in the description of FIG. 22, the processing performed by the I/O controller 1300 may also be performed by the processor 1310 which executes the I/O processing program 1240, for example. The processor 1310 may also cause the virtual volume processing program 1220 to execute processing relating to the virtual volume.

Figure 23:
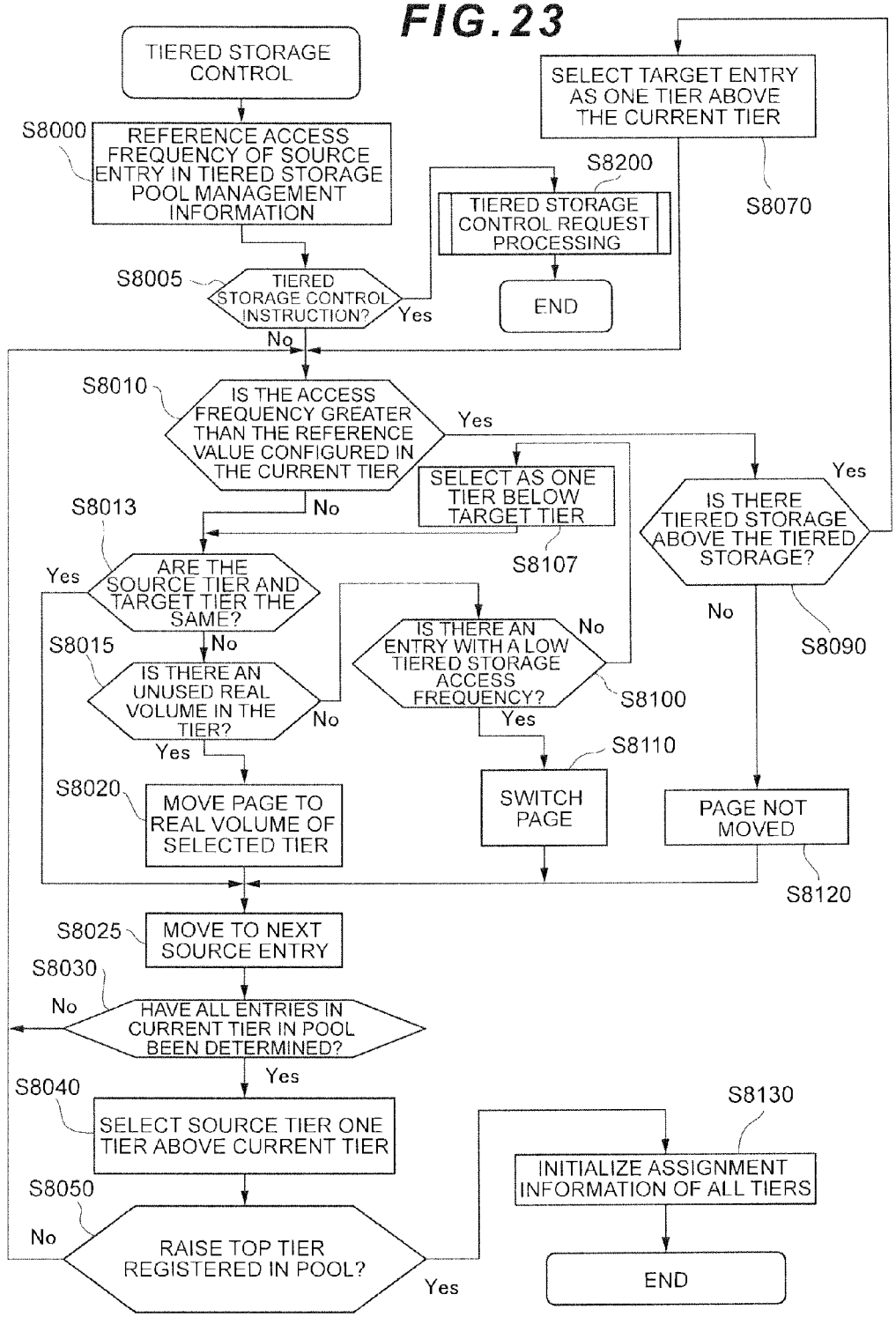
FIG. 23 is a flowchart showing a processing routine for tiered storage control processing according to this embodiment.

FIG. 23 is a flowchart showing a processing routine for tiered storage control processing in the storage apparatus 300 which is executed in step S5020 of FIG. 21. The tiered storage control processing is processing which is used in tiered storage control that is executed periodically or in tiered storage control which is executed using an instruction of the management computer 100. The tiered storage control processing in each pool is described hereinbelow.

First, the I/O controller 1300 of the storage apparatus 300 references assignment information 12907 in the tiered storage pool management information 1290 in the designated pool (S8000). In step S8000, the I/O controller 1300 performs referencing in order starting with the top entry in the tiered storage address map information in the lowest tier. Hence, for the purposes of a description, the tier which the I/O controller 1300 references as a current page substitution source is known as the source tier, and an entry in the tiered storage address map information of the source tier in the tiered storage pool management information 1290 is known as a source entry. Furthermore, the tier referenced as a page substitution destination is known as the target tier and an entry in the tier address map information of the target tier in the tiered storage pool management information 1290 is known as a target entry.

The I/O controller 1300 then determines whether the current tier control processing depends on a tiered storage control instruction (S8005). Here, tier control request processing (S8200) is executed if the current tier control processing is indeed dependent on the tiered storage control instruction. If, on the other hand, there is no tiered storage control instruction, the I/O controller 1300 executes the processing of step S8010 and subsequent steps.

The I/O controller 1300 compares a standard access frequency (reference value) which is prescribed for the source tier with the access frequency in the assignment information 12907 for that entry (S8010). In the tiered storage control processing, an access frequency which serves as the standard (standard access frequency) is designated beforehand by the user or similar for each tier. In step S8010, if the standard access frequency is exceeded, page movement is executed between real volumes of different tiers.

In cases where the access frequency 12910 of the source entry exceeds the standard value in step S8010, the I/O controller 1300 determines whether there is an upper tier in the source tier (S8090). If it is determined in step S8090 that there is one tier above the source tier, the I/O controller 1300 selects this tier as the target tier (S8070) and compares the tier with the standard value for the tier (S8010). Here, the initial value of the target tier is configured as the same value as the source tier.

The I/O controller 1300 repeats the above processing and specifies the target tier not exceeding the reference value. Note that, if it is determined in step S8090 that there is no tier above the source tier, the I/O controller 1300 executes the processing of step 8025 and subsequent steps without moving the corresponding page (S8120). Thus, if there is no tier above the source tier, that is, if the I/O controller 1300 determines that the source tier is the top tier, in order to continue using the top tier, the I/O controller 1300 continues the processing as is without performing source entry page movement.

If, on the other hand, the access frequency 12910 of the source entry is no more than the standard value in step S8010, the I/O controller 1300 determines whether the source tier and target tier are the same (S8013). if it is determined that the source tier and target tier are the same in step S8013, the I/O controller 1300 determines that the page indicated by the source entry satisfies the reference value of the currently disposed tiered storage and that there is no need to move the source entry page, and executes the processing of step S8025 and subsequent steps.

If, on the other hand, it is determined in step S8013 that the source tier and target tier are not the same, the I/O controller 1300 determines that the page indicated by the source entry does not satisfy the reference value of the currently disposed tiered storage and that there is a need to move the source entry page, and references the unused total capacity 12905 of the tiered storage address map information of the target tier and checks whether there is an unused real volume for which page movement to the target tier is possible (S8015).

If it is determined in step S8015 that there is no unused real volume in the target tier, the I/O controller 1300 determines whether the assignment information is an item other than a page lock and an entry with a lower referencing frequency than the referencing frequency of the access frequency 12910 for the source entry to the target tier (S8100).

If it is determined in step S8100 that there is no entry with a lower referencing frequency than the access frequency 12910 of the source entry to the target tier or that there is an entry with a lower referencing frequency than the access frequency 12910 of the source entry to the target tier but the assignment information 12907 is only page lock, the I/O controller 1300 selects a tier one tier lower than the target tier as the target tier (S8107) and determines whether the target tier is the same as the source tier (S8013).

If it is determined in step S8100 that there is an entry with a lower referencing frequency than the referencing frequency of the access frequency 12910 of the source entry to the target tier and the assignment information 12907 of the entry is an item other than page lock, the I/O controller 1300 executes switching between the source entry and target entry pages (S8110).

If it is determined in step S8015 that an unused real volume permitting page movement exists in the target tier, the I/O controller 1300 executes page movement to the unused real volume in the target tier (S8020).

The I/O controller 1300 executes step S8020, S8110, or S8120 and subsequently changes the source entry to the next entry (S8025).

The I/O controller 1300 then checks whether determination processing has been executed for all the source entries in the source tier in the pool (S8030) and if there is an unprocessed entry, re-executes the processing of step S8010 and subsequent steps.

If, on the other hand, it is determined in step S8030 that there is no unprocessed entry in the source tier, [the I/O controller 1300] configures a tier that is one tier higher than the source tier as the source tier (S8040). If the tier configured in step S8040 does not exceed the top tier, that is, if a tier that is one tier above the source tier exists (No in S8050), the I/O controller 1300 executes the processing once again starting with step S8000.

If, on the other hand, the tier configured in step S8040 exceeds the top tier, that is, if no tier that is one tier higher than the source tier exists (Yes in S8050), the I/O controller 1300 resets the referencing frequency of the access frequency 12910 in the tiered storage address map information of all the tiers in the pool is reset to zero (S8130), and ends the tiered storage control processing.

Figure 24:
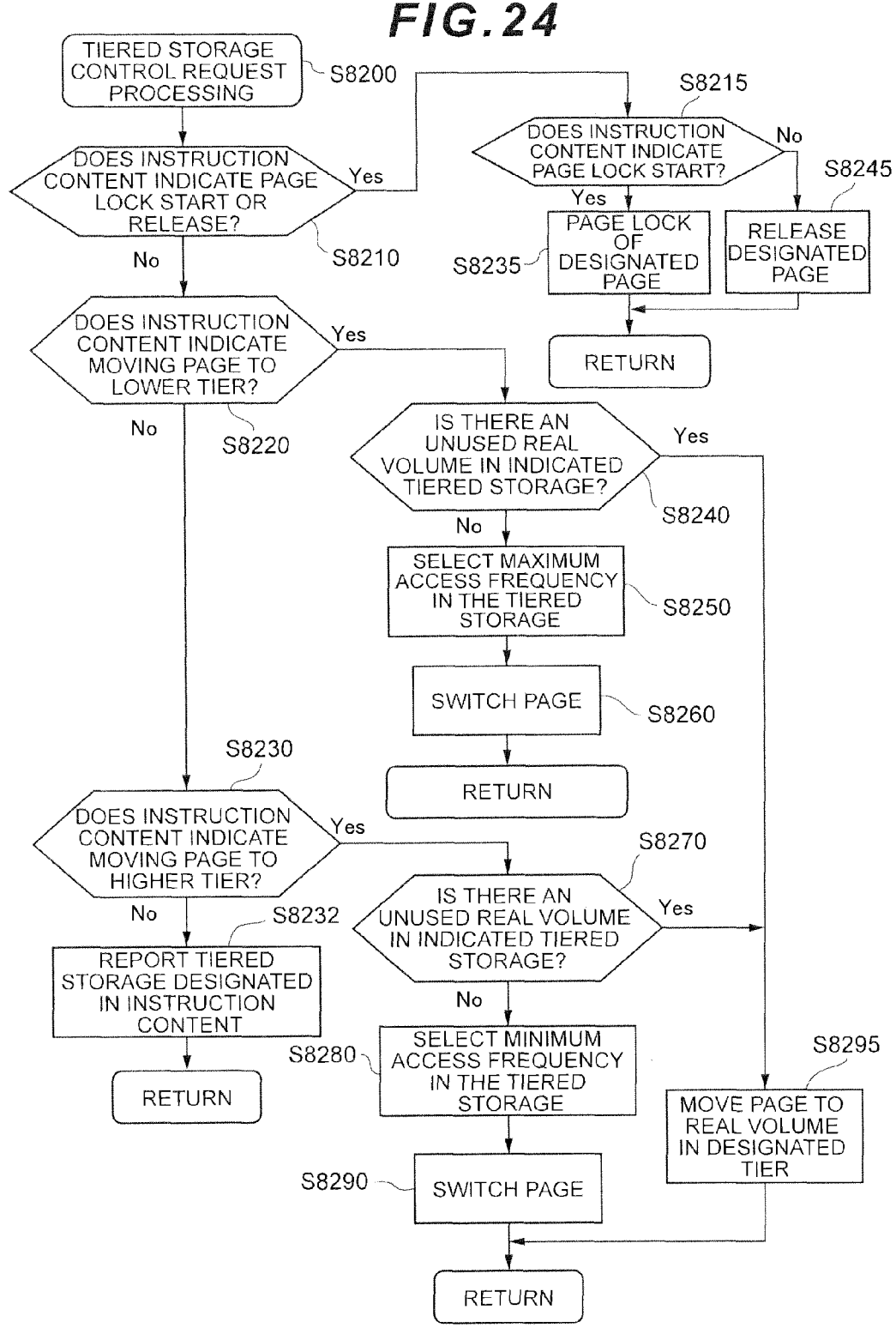
FIG. 24 is a flowchart showing a processing routine for tiered storage control request processing according to this embodiment.

FIG. 24 is a flowchart showing a processing routine of tiered storage control request processing of the storage apparatus which is executed in step S8200 of FIG. 23. The tiered storage control request processing is premised on the fact that the tiered storage control processing which is executed in the storage apparatus 300 is executed in response to an instruction from the management computer 100. Whereas the tiered storage control processing shown in FIG. 23 is processing which is executed at regular intervals, tiered storage control request processing is processing that is executed based on an instruction from the management computer 100. Furthermore, although the tiered storage control request processing is described based on the premise that the processing is executed in page units, in cases where a plurality of pages are contained in the address map designated in the option area of the I/O request, this processing is executed repeatedly a number of times corresponding to the number of pages. The tiered storage control request processing for each pool will be described hereinbelow.

First, the I/O controller 1300 of the storage apparatus 300 determines whether the instruction content 73002 designated by the I/O request 7300 is page lock start or page lock release (S8210). If it is determined in step S8210 that the instruction content 73002 is page lock start or release, the I/O controller 1300 executes the determination processing for page lock processing (S8215).

In step S8215, the I/O controller 1300 also determines whether the instruction content 73002 of the I/O request is page lock start. In a case where it is determined in step S8215 that the instruction content 72002 is page lock start, the I/O controller 1300 executes step S8235. If, on the other hand, it is determined in step S8215 that the instruction content 72002 is not page lock but rather page release, the I/O controller 1300 executes step S8245.

In step S8235, the I/O controller 1300 page-locks the page designated in the I/O request address 73001. More specifically, the I/O controller 1300 configures the page lock flag of the entry in the virtual logical volume management information 1270 indicated by the address of the virtual logical volume designated in the I/O request address 73001 as Yes. In addition, the I/O controller 1300 page-locks the assignment information 12907 in the assignment address of the tiered storage pool management information 1290 from the tier address pointer of the entry in the virtual logical volume management information 1270. The I/O controller 1300 subsequently ends the tiered storage control request processing and returns to the caller processing.

Furthermore, in step S8245, the I/O controller 1300 releases the page designated in the I/O request address 73001. More specifically, the I/O controller 1300 configures the page lock flag of the entry in the virtual logical volume management information 1270 indicated by the address of the virtual logical volume designated in the address 73001 of the I/O request as No. In addition, the I/O controller 1300 releases the page lock of the address assignment information 12907 of the tiered storage pool management information 1290 from the tiered address pointer of the entry in the virtual logical volume management information 1270. The I/O controller 1300 subsequently terminates the tiered storage control request processing and returns to the caller processing.

If, on the other hand, as a result of the determination of step S8210, the instruction content 73002 is not page lock start or release, the I/O controller 1300 determines whether the instruction content 73002 of the I/O request is page movement and whether the tier designated in the I/O request is lower than the tier of the tiered storage where the page designated by the I/O request is currently disposed (S8220). In step S8220, the I/O controller 1300 acquires the tiered storage where the page designated in the I/O request is disposed and hence references the entry in the virtual logical volume management information 1270 corresponding to the address designated in the I/O request and references the tier number 12704 of the entry. If it is determined in step S8220 that page movement is performed from the current tiered storage to the lower tiered storage, the I/O controller 1300 executes the processing of step S8240.

In step S8240, the I/O controller 1300 determines whether there is an unused real volume in the tiered storage where the page designated in the I/O request is disposed (S8240). More specifically, the I/O controller 1300 references the unused total capacity 12905 of the tiered storage pool management information 1290 to acquire the unused total capacity of the tiered storage where the page designated in the I/O request is disposed. As a result, the I/O controller 1300 determines, from the unused total capacity thus obtained, whether a new page can be placed in the tiered storage.

If it is determined in step S8240 that a new page can be placed in the tiered storage, the I/O controller 1300 moves the page designated in the I/O request to the tiered storage designated from the current tiered storage (S8295).

If, on the other hand, it is determined in step S8240 that a new page cannot be placed in the tiered storage, the I/O controller 1300 replaces one page at the movement destination tiered storage with the page designated in the I/O request. The page selected from the tiered storage serving as the movement destination is the page with the highest access frequency in the tiered storage. This is because the tiered storage to which movement is to take place in the page substitution is above the currently disposed tiered storage, with the intention of making effective usage of the superior performance of the upper tiered storage which is the movement destination. More specifically, the I/O controller 1300 references the access frequency 12910 in the entry of the tiered storage address map information which is the movement destination designated by the I/O request 7300 in the tiered storage pool management information 1290 and selects the highest frequency (S8250).

The I/O controller 1300 then replaces the page designated in the I/O request 7300 with the movement destination page selected in step S8250 (S8260). After switching is complete, the I/O controller returns to the caller processing.

If, on the other hand, it is determined in step S8220 that the page is not moved to tiered storage below the current tiered storage, the I/O controller 1300 executes step S8230.

In step S8230, the I/O controller 1300 determines whether the instruction content 73002 of the I/O request is page movement and whether the tier designated in the I/O request is above the tier of the tiered storage where the page designated in the I/O request is currently disposed (S8230). So too in the case of the determination of step S8230, it is determined by means of the same procedure as the determination performed in step S8220 whether to move the page designated in the I/O request 7300 to the upper tiered storage.

If it is determined in step S8230 that page movement is to tiered storage which is above the current tiered storage, the I/O controller 1300 executes step S8270.

In step S8270, the I/O controller 1300 uses the same procedure as in step S8240 to acquire the unused total capacity of the tiered storage where the page designated in the I/O request is disposed and determines from the unused total capacity obtained whether placement of a new page in the tiered storage is possible.

If it is determined in step S8270 that a new page can be placed in the tiered storage, the I/O controller 1300 moves the page designated by the I/O request to the tiered storage designated by the current tiered storage (S8295).

It is determined in step S8270 that placement of a new page in the tiered storage is not possible, the I/O controller 1300 executes substitution of a single page in the movement destination tiered storage with the page designated in the I/O request. In step S8290, described subsequently, the page selected from the tiered storage which is the movement destination is the page with the lowest access frequency in the tiered storage. This is because the tiered storage which is moved through page substitution is below the currently disposed tiered storage and hence sufficient usage of the tiered storage can be made even with the low performance of the lower tiered storage of the movement destination.

More specifically, the I/O controller 1300 references the access frequency 12910 in the entry of the tiered storage address map information which is the movement destination designated by the I/O request 7300 of the tiered storage pool management information 1290 and selects the smallest frequency (S8280).

The I/O controller 1300 then substitutes the movement destination page selected in step S8280 with the page designated in the I/O request 7300 (S8290). After the substitution, the I/O controller returns to caller processing.

If, on the other hand, it is determined in step S8230 that there is no page movement to tiered storage above the current tiered storage, the I/O controller 1300 executes step S8232 assuming that the tier control instruction of the I/O request acquires volume tier states.

In step S8232, the I/O controller 1300 acquires the tier placement of the virtual logical volume designated by the I/O request and sends same back to the request source of the I/O request 7300. More specifically, the I/O controller 1300 references the address map of the virtual logical volume management information 1270 indicated by the logical volume designated in the address of the I/O request 7300 and extracts the virtual address 12703 and tier number 12704 in the address map from the address map and sends back this information to the source of the I/O request 7300 (step 8232). The I/O controller 1300 subsequently returns to caller processing.

As a result of performing tiered storage control request processing in the storage apparatus 300 as described above, the tiered storage in the storage apparatus 300 can be controlled in page units on the basis of an instruction from the management computer 100.

(1-5-2) Details of Operation of Host Computer

Figure 25:
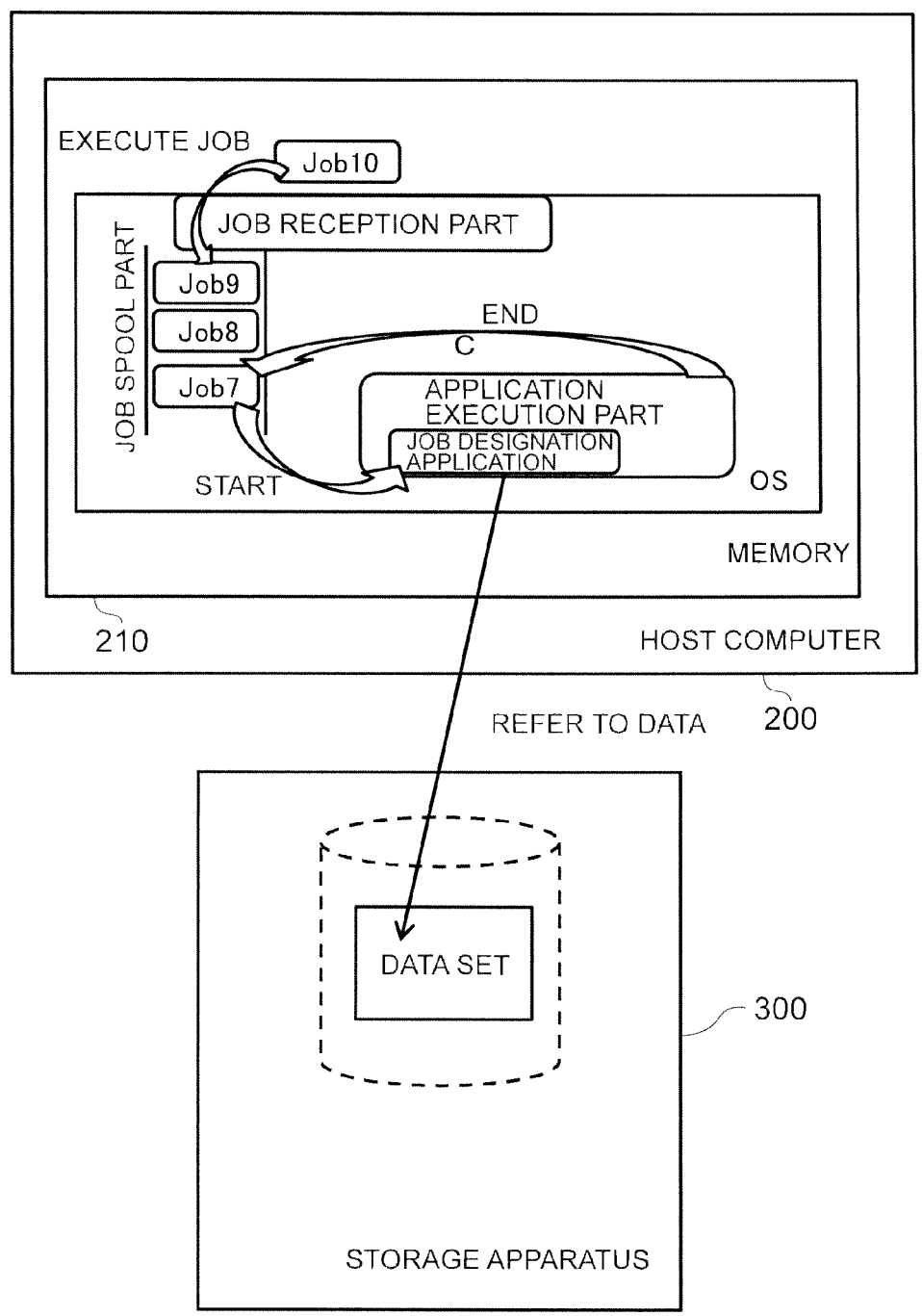
FIG. 25 is a conceptual diagram illustrating the concept of an application and jobs according to this embodiment.

Details of the operation of the host computer 200 will be described next. FIG. 25 is a conceptual diagram for describing the concept of the applications and jobs running on the host computer 200.

The host computer 200 is capable of executing one or more applications simultaneously. If an application is executed, an application name which is targeted for execution by the script program known as a job is prescribed together with a data set name which is used by the application and the job is executed (submitted). More specifically, a job can be prescribed not only an application name and data set name but also a job name, a job class for distinguishing between jobs, and a job user and so on. When job execution is indicated by the user, the host computer 200 starts the job according to an instruction from the OS 212.

As shown in FIG. 25, the OS 212 comprises three processing parts for processing jobs in the host computer 200. More specifically, the OS 212 contains a job reception [part], a job spool, and an application execution part. For example, when job execution is indicated by the user, the job reception part in the OS receives the job and commands the host computer 200 to perform processing to acquire various information prescribed by the job. Here, a job whose execution is indicated by the user is called the job.

The host computer 200 executes the job-related processing of the job spool part after acquiring the information prescribed by the job. In the job spool part, execution of the job is put on hold until the job processing is enabled by the application execution part.

When new job processing is enabled by the application execution part, the host computer 200 switches the processing relating to the job from the job spool part to processing of the application execution part. An application prescribed by the job is executed by the application execution part. Execution of the application starts and the application program data prescribed by the job is referenced.

When the processing by the application execution part ends (that is, the processing of the application prescribed by the job ends), the host computer 200 executes processing to end the job and ends the job.

(1-5-3) Details of the Operation of the Management Computer

The details of the operation of the management computer 100 will be described next. The management computer 100 performs operations in two stages which are a preliminary stage and an operation stage. In specific terms, if an instruction is issued to the storage apparatus 300, the management computer 100 issues an instruction to the agent program 213 which exists in the memory 210 of the host computer 200 and the host computer 200 issues an I/O request to the storage apparatus 300 according to the instruction of the agent program 213. Furthermore, the host computer 200 is able to detect changes in the state of the OS and applications on the host computer 200 and if such a change is detected, notifies the management computer 100 of this content via the communication network 550. The management computer 100, which is informed of the detection result by the host computer 200, issues an instruction to the host computer 200 or storage apparatus 300 according to the notification content and controls the device. Thus, the reason why the host computer 200 is separate from the management computer 100 is so that a plurality of host computers 200 are managed collectively by a single management computer.

Figure 26:
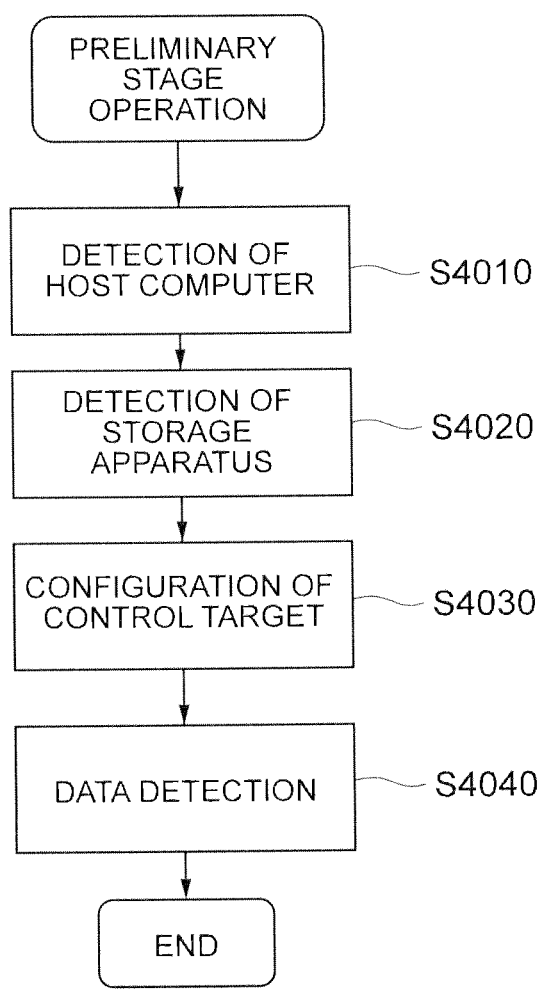
FIG. 26 is a flowchart showing the details of an operation for the system environment creation stage according to this embodiment.

First, details of the operation of the management computer 100 in the preliminary stage will be provided. FIG. 26 is a flowchart showing the details of the operation in the environment creation stage in the management computer 100.

The preliminary stage operation is realized as a result of the processor 120 of the management computer 100 executing processing on the basis of the storage management program 111. Although described simply using flowcharts with the management computer 100 as the main subject, all the operations are executed by the processor 120 of the management computer 100.

First, the management computer 100 detects the host computer 200 which exists in the computer system 10 (S4010). As information for detecting the host computer 200, for example, IP addresses which are input by the user of the management computer 100 are used. Where address inputs are concerned, an IP address range from 192.168.1.1 to 192.168.1.50 may, for example, be input, or a specific IP address may be input. The management computer 100 creates an information acquisition request for the agent program 213 of the host computer 200 and issues this request to the IP address that has been input. If the host computer 200 receives an information acquisition request, the host computer 200 issues notification to the management computer 100 that the host computer 200 exists based on an instruction of the agent program 213 in the host computer 200. In response to the reply from the host computer 200, the management computer 100 creates the host configuration management table 118 on the basis of the information contained in the reply. However, at this point in time, the management computer 100 configures information for discriminating the host computer 200 such as the IP address and host ID and the like of the host computer which responded only to the host ID 1181 of the host configuration management table 118.

The management computer 100 then detects the storage apparatus 300 which exists in the computer system 10 (S4020). For the detection of the storage apparatus 300 in step S4020, similarly to step S4010, an information acquisition request for the storage apparatus 300 is created by the management computer 100 on the basis of the IP address input by the user of the management computer 100. In the storage apparatus 300, upon receiving the information acquisition request, the processor 1310 of the storage controller 1000 references the volume management information 1250 and the storage basic information 1260 stored in the shared memory 1200 and sends back this information together to the management computer 100. In response to the reply from the storage apparatus 300, the management computer 100 creates a storage information table 101 based on the information contained in the reply.

The management computer 100 configures the application data serving as the control target and the corresponding priority level (S4030). The configuration of application data includes, not only target designation for configuring data directly, but also time designation which targets all the applications executed at a designated time, job designation which designates jobs for running an application, a job class designation which designates job types, and user name designation which targets all the jobs executed by a certain specific user, and so on. Otherwise, the tiered storage target data may be designated indirectly. This data designation enables a plurality of items to be designated.

Furthermore, if a plurality of items are designated, the priority level of each item is designated. Meanwhile, data priority levels include high priority and low priority. If a plurality of control target data are designated, all the data corresponding to the designated item is the target of tiered storage control. If one data corresponds to a plurality of items, priority is given to input items of a high priority. The management computer 100 stores items designated by the user in the user configuration information management table 114. Here user of the management computer 100 is able to make the above configurations via an input device or the like while looking at an input screen of the management computer 100.

Figure 27:
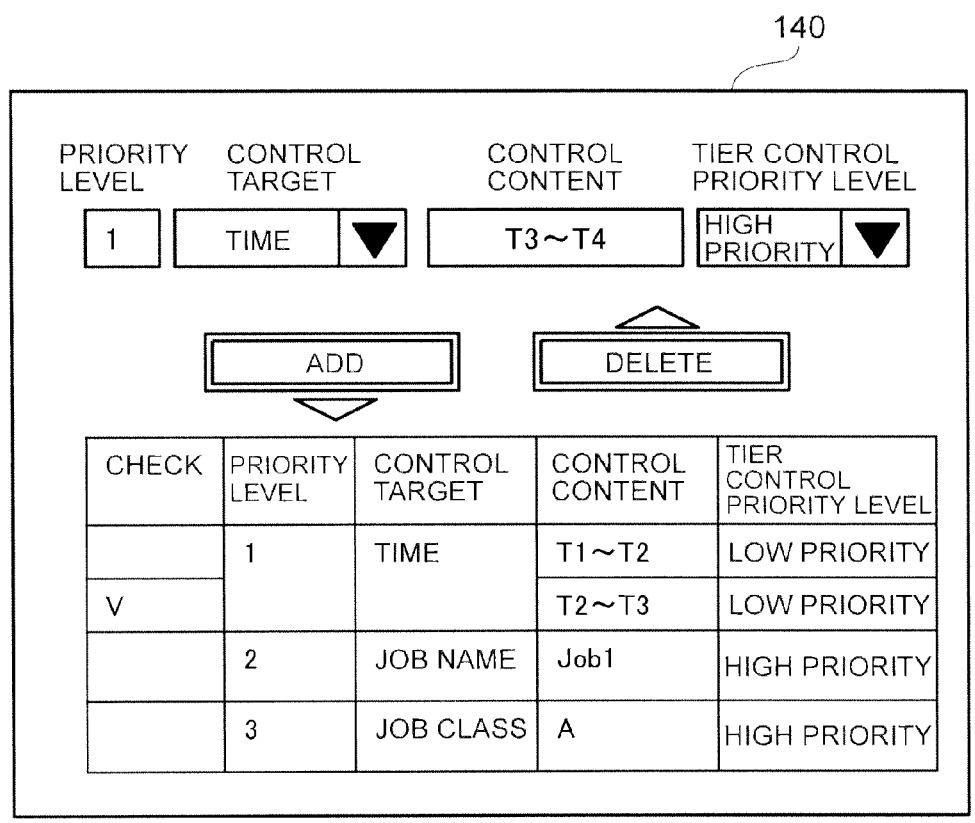
FIG. 27 is a table showing an example of an input screen of a management computer 100 according to this embodiment.

Here, FIG. 27 shows an example of an input screen of the management computer 100. Time designation and designation of the job name and job class can be made via an input screen 140 in FIG. 27 and, for each of the items, all the data used by the jobs executed at times T1 and T2, for example, is subject to low priority tier control. Here, even assuming that the data which is configured with a low priority and disposed in upper tiered storage is page-locked, this data may be subject to page substitution. For example, page substitution processing is executed if an unused area must be created in upper tiered storage for the purpose of subsequent tier control of data configured with a high priority. Such page substitution processing is described hereinbelow with the term interception processing. This interception processing will be described in detail subsequently.

The management computer 100 then detects data (S4040). The management computer 100 detects data on the basis of volume information registered in the OS 212 of the host computer 200 and of the storage information table 101 created in step S4020. More specifically, the management computer 100 selects a volume which is a virtual logical volume in the volume identified by the host computer 200. The data detection processing is executed as a result of the management computer 100 creating an information acquisition request for the agent program 213 of the host computer 200 and makes the request by issuing same to the host computer 200.

Upon receiving the information acquisition request, the host computer 200 sends back configuration information of the host computer 200 to the management computer 100 on the basis of the instruction of the agent program 213 in the host computer 200. This configuration information includes information such as the data name, the logical volume where the data is stored, and the storage address of the logical volume (the storage address is, for example, the cylinder of the logical volume, the header count, or the SCSI LBA or the like).

The management computer 100 registers the logical volume detected from the configuration information in the volume information of the host configuration management table 118 (1182, 1183, 1184, 1185, and 1186). In addition, the management computer 100 focuses only on the virtual logical volumes which are targeted by the tiered storage control processing, and therefore registers only the volume information, for which the virtual flag 1013 in the storage information table 101 is virtual logical volume, in the data set name 11301, the device ID 11302, and the storage ADR 11303 in the control target data management table 113.

The management computer 100 then references the I/O frequency management table 115. As a result, the management computer 100 is able to acquire, from the virtual logical volumes registered in the control target data management table 113, the file organizations pertaining to the data disposed in the volumes as well as information required for detection of frequently accessed areas. The management computer 100 employs measures designated in the method 11504 for acquiring the I/O frequency management table 115 to acquire the file organizations of the data registered in the control target data management table 113 and acquire the file organization details. Here, the results of implementing the tools for specifying file organizations of the OS 212 are registered in the file organizations, and registered in the file organization details is information on the areas subject to high frequency I/Os in the data acquired by the measures described in the method 11504 for acquiring the information in the I/O frequency management table 115.

Details of the operation of the management computer 100 in the operation stage will be described next. In the operation stage, there are three operations, depending on the state of the job being executed, that is, a tiered storage assignment operation, a tiered storage priority level modification operation, and a tiered storage assignment release operation. The details of the operation by the management computer 100 at each stage of the operation will be described in order hereinbelow.

Figure 28:
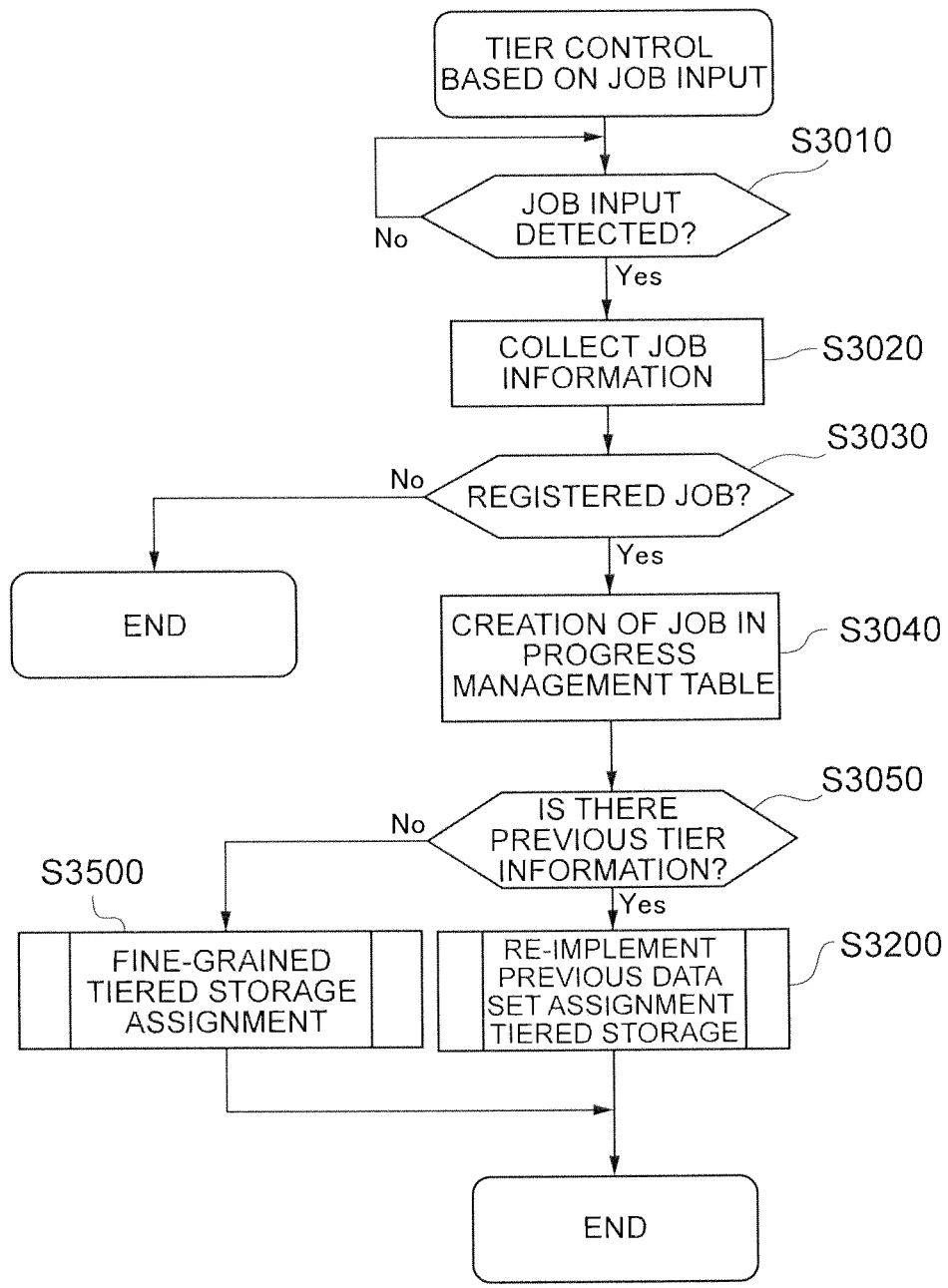
FIG. 28 is a flowchart showing a tiered storage assignment operation according to this embodiment.

First, the tiered storage assignment operation at the operation stage will be described with reference to FIG. 28. The tiered storage assignment operation by the management computer 100 is started at the moment the jobs targeted for tiered storage control are executed by the host computer 200. In order to detect execution of the job, the host computer 200 monitors the processing of the OS 212 of the host computer 200 according to an instruction from the agent program 213.

The management computer 100 determines whether the job is executed in the host computer 200 (S3010). As mentioned earlier, the host computer 200 detects that a job is initiated via the OS 212. The host computer 200 detects that a job has been executed via the OS 212 and notifies the management computer 100 that the job has been executed. Here, the job executed by the host computer 200 is called an execution job.

The management computer 100 commands the host computer 200 to collect information relating to the execution job (S3020). The host computer 200 which receives the instruction to collect information relating to the executed job makes an inquiry to the OS 213 and collects the information relating to the executed job and issues notification to the management computer 100. Examples of information relating to the executed job which is collected in step S3020 includes the job name, the data set name, the user name, and the job class or the like.

The management computer 100 then determines whether the job information collected in step S3020 is a tiered storage control target job (S3030). The management computer 100 references the user configuration information management table 114 and executes determination of step S3030 by comparing whether the executed job corresponds to the item configured by the user. If it is determined in step S3030 that the executed job is not a tiered storage control target, the management computer 100 ends the processing.

Meanwhile, if, in step S3030, the executed job is a tiered storage control target, the management computer 100 creates the job in progress management table 112 on the basis of the information on the executed job which is obtained in step S3020 and the tiered storage priority level 11404 of the item corresponding to the user configuration information management table 114 (S3040).

The management computer 100 then determines that the executed job is executed in the host computer 200 (S3050). If, in step S3050, the same data set name as the data set name 11202 in the job in progress management table 112 thus created is in the control target data management table 113 and the previous tier pointer 11306 in the control target data management table 113 associated with the data set name has been registered, the management computer 100 determines that the executed job has previously been executed. If it is determined in step S3050 that the executed job has been previously executed, the management computer 100 executes the previous executed job assignment tiered storage processing (S3200), described subsequently, and ends the processing.

If, on the other hand, it is determined in step S3050 that the executed job has not been executed previously, the management computer 100 executes fine-grained tiered storage assignment processing (S3500), described subsequently, and ends the processing.

As a result of the above tiered storage assignment operation by the management computer 100, those jobs, among the jobs executed by the host computer 200, which are tiered storage control targets, are selected and if a job which is being executed has also been executed previously, tiered storage control processing based on the actual results of the previous job execution is executed. Furthermore, even if the job has not been executed previously, tiered storage which is based on file organization characteristics can be controlled in precise units.

Figure 29:
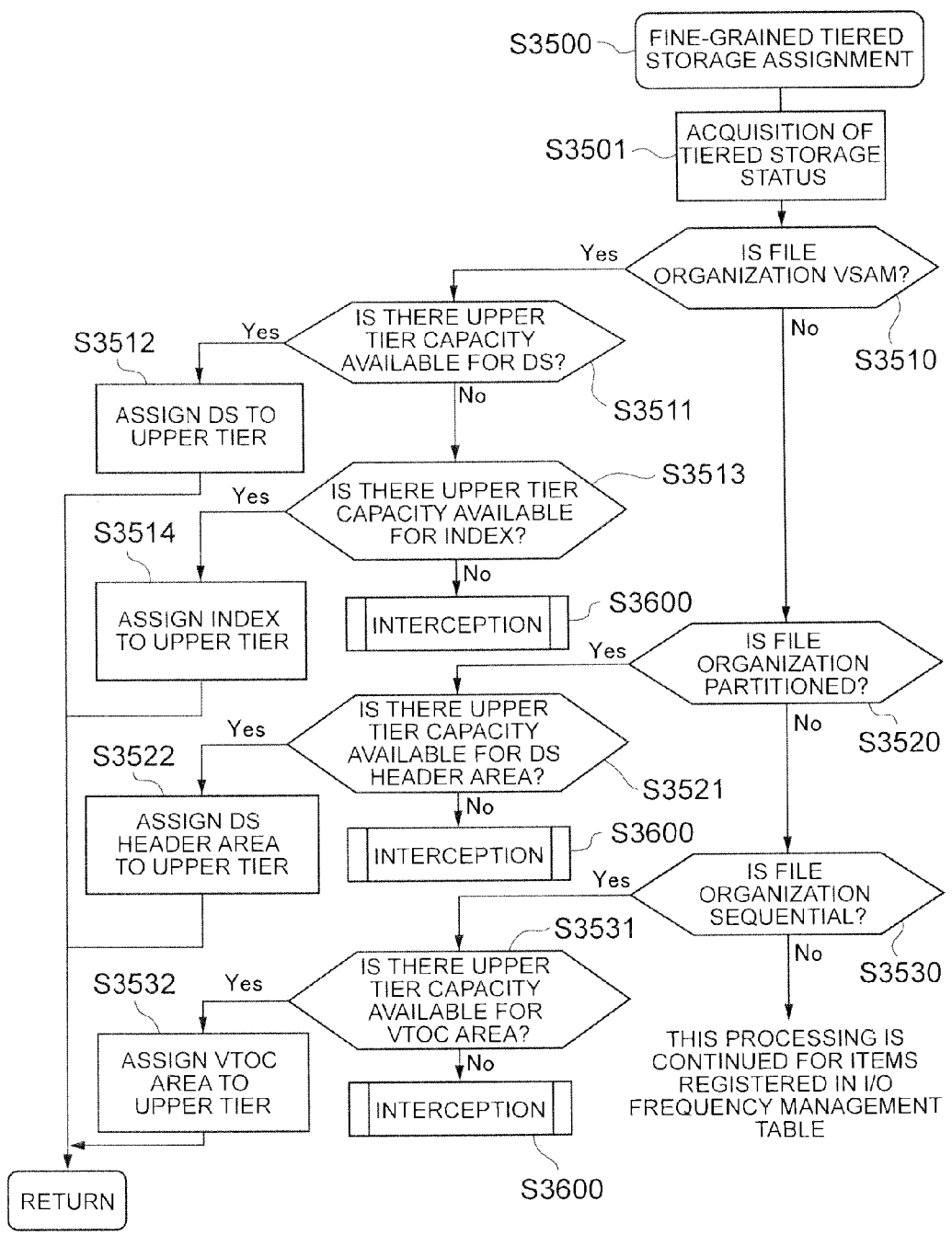
FIG. 29 is a flowchart showing a processing routine for fine-grained tiered storage assignment processing according to this embodiment.

Fine-grained tiered storage assignment processing in step S3500 in FIG. 28 will be described next. FIG. 29 is a flowchart showing a processing routine for fine-grained tiered storage assignment processing by the management computer 100.

First, the management computer 100 acquires the state of the tiered storage of the storage apparatus 300 (S3501). More specifically, the management computer 100 grasps the tiered storage states of the storage apparatus 300 and therefore issues an instruction relating to the state of the tiered storage capacity of the storage apparatus 300 to the host computer 200. As a result of the instruction from the management computer 100, the host computer 200 creates an I/O request 7300 designating pool state acquisition as instruction content and issues the I/O request 7300 to the storage apparatus 300. The storage apparatus 300 which receives the I/O request 7300 references the tiered storage pool management information 1290 which contains the pool ID indicated in the I/O request and sends back the tiered storage number, total capacity information, and unused total capacity information and the like to the host computer 200. The host computer 200 which receives an I/O request reply transfers the acquired information to the management computer 100. Upon receiving the information from the host computer 200, the management computer 100 updates the area (full capacity 11602, unused capacity 11603) in the tiered storage usage status management table 116.

The management computer 100 then executes tiered storage control processing on the basis of the file organization of the executed job thus detected in the tiered storage assignment operation. More specifically, the management computer 100 acquires the file organizations of the executed job from the control target data management table 113 and determines whether the file organization is virtual storage access (VSAM) (S3510).

If the file organization thus obtained in step S3510 is virtual storage access (VSAM), the management computer 100 executes processing (steps 3511, 3512, 3513, 3514) for tiered storage control for virtual storage access file organization.

In step 3511, the management computer 100 determines whether there is top tiered storage capacity available for the data set (DS) (S3511). More specifically, the management computer 100 acquires information on the virtual storage access file organization in the I/O frequency management table 115 and acquires I/O frequency information relating to the file organization of the data for the executed job. Further, the management computer 100 ascertains, as a result of acquiring the I/O frequency management table 115, that the area with the highest I/O frequency is the index area and the area with the next highest I/O frequency is the data set as a whole. Therefore, the management computer 100 references the unused capacity 11603 in the tiered storage usage status management table 116 and determines whether the whole data set used by the executed job can be placed in upper tiered storage. In step S3511, it is determined whether the whole data set used by the executed job can be placed in upper tiered storage in order to obtain the highest I/O performance from the storage apparatus 300.

If it is determined in step S3511 that the whole data set can be placed in the upper tier, the management computer 100 assigns the whole data set to the upper tier (S3512). More specifically, the management computer 100 registers the whole data set and corresponding tier number in the tier table 117 and commands the host computer 200 to execute page tier movement and start a page lock on the basis of the tier table 117. The host computer 200 which receives the instruction then creates an I/O request to register the page tier movement and optionally the content in the tier table 117 in the instruction content, and issues an instruction to the storage apparatus 300. The host computer 200 then creates an I/O request to register the start of page lock and optionally the content of the tier table 117 in the instruction content and issues an instruction to the storage apparatus 300. The storage apparatus 300 receives the two I/O requests and performs the page movement and page lock processing relating to the storage area designated in the I/O request. After completing the tiered storage control of the storage apparatus 300, the management computer 100 changes the file organization detail 11305 in the control target data management table 113 to data set. Further, the management computer 100 updates the values of the page locked capacity 11604 and 11605 in the tiered storage usage status management table 116. Here, the priority level is updated to high priority or low priority on the basis of the content configured for the priority level 11204 in the job in progress management table. That is, if the priority level 11204 in the job in progress management table 112 is high priority, the information of the high priority 11604 in the tiered storage usage status management table 116 is updated.

If it is determined in step S3511 that the whole data set cannot be placed in the upper tier, the management computer 100 determines whether there is upper tier capacity available for the index (S3513). More specifically, the management computer 100 references the unused capacity 11603 in the tiered storage usage status management table 116 to determine whether the index area with the highest referencing frequency in the data set used by the executed job can be placed in upper tiered storage.

If it is determined in step S3513 that the index area can be placed in the upper tier, the storage apparatus 300 is instructed to perform tiered storage control corresponding to the index area in the same way as the processing described in step S3512. After tiered storage control of the storage apparatus 300 is complete, the management computer 100 changes the file organization details 11305 in the control target data management table 113 to index. The management computer 100 then updates the values in the page locked capacity 11604 and 11605 in the tiered storage usage status management table 116 (S3514).

If it is determined in step S3513 that placement of the index area in the upper tier is not possible, the management computer 100 executes interception processing, which will be described subsequently (S3600).

If, on the other hand, it is determined in step S3510 that the file organization of the executed job is not VSAM, but rather partitioned organization, the management computer 100 executes processing (steps S3521, S3522) for the purpose of tiered storage control which is used for a partitioned file organization.

In step S3521, the management computer 100 determines whether there is upper tiered storage capacity for the first area of the data set (S3521). More specifically, the management computer 100 acquires the partitioned organization information in the I/O frequency management table 115 and acquires the I/O frequency information relating to the file organization of the executed job usage data. By acquiring the information from the I/O frequency management table 115, the management computer 100 ascertains that the area with the highest I/O frequency is a directory area. The management computer 100 therefore references the unused capacity 11603 in the tiered storage usage status management table 116 to determine whether the directory area can be placed in the upper tiered area within the data set used by the executed job. In order to obtain the highest I/O performance from the storage apparatus 300 in step S3521, it is determined whether the directory area can be placed in the upper tiered storage within the data set used by the executed job.

If it is determined in step S3521 that the directory area can be placed in the upper tier, the management computer 100 issues an instruction to assign the directory area to the upper tier (S3522). More specifically, the management computer 100 registers a directory area and corresponding tier number in the tier table 117 and issues an instruction to the host computer 200 to perform page tier movement and start a page lock on the basis of the tier table 117. The host computer 200 which receives this instruction creates an I/O request to register the page tier movement and optionally the content in the tier table 117 in the instruction content, and issues an instruction to the storage apparatus 300. The host computer 200 then creates an I/O request to register the start of page lock and optionally the content of the tier table 117 in the instruction content and issues an instruction to the storage apparatus 300. The storage apparatus 300 receives the two I/O requests and executes the page movement and page lock processing relating to the storage area designated in the I/O request. After completing the tiered storage control of the storage apparatus 300, the management computer 100 changes the file organization detail 11305 in the control target data management table 113 to data set. The management computer 100 then updates the values of the page locked capacity 11604 and 11605 in the tiered storage usage status management table 116. Here, the priority level is updated to high priority or low priority on the basis of the content configured for the priority level 11204 in the job in progress management table. That is, if the priority level 11204 in the job in progress management table 112 is high priority, the information of the high priority 11604 in the tiered storage usage status management table 116 is updated.

If it is determined in step S3521 that assignment of the directory area to the upper tier is impossible, the management computer 100 executes subsequent interception processing (step 3600).

Meanwhile, if it is determined in step S3520 that the file organization of the executed job is not partitioned but rather sequential, the management computer 100 executes processing (steps S3531, S3532) for performing tiered storage control for sequential file organization.

In step S3531, the management computer 100 determines whether there is upper tiered storage capacity available for a VTOC area. More specifically, the management computer 100 acquires the partitioned information in the I/O frequency management table 115 and acquires I/O frequency information relating to the file organization of the executed job usage data. By acquiring the information from the I/O frequency management table 115, the management computer 100 ascertains that the area with the highest I/O frequency is a VTOC area. The management computer 100 therefore references the unused capacity 11603 in the tiered storage usage status management table 116 to determine whether the VTOC area can be placed in the upper tiered area within the data set used by the executed job. In order to obtain the highest I/O performance from the storage apparatus 300 in step S3531, it is determined whether the VTOC area can be placed in the upper tiered storage.

If it is determined in step S3531 that the VTOC area can be placed in the upper tier, the management computer 100 issues an instruction to assign the VTOC area to the upper tier (S3532). More specifically, the management computer 100 registers the VTOC area and corresponding tier number in the tier table 117 and issues an instruction to the host computer 200 to perform page tier movement and start a page lock on the basis of the tier table 117. Upon receipt of this instruction, the host computer 200 which receives this instruction creates an I/O request to register the page tier movement and optionally the content in the tier table 117 in the instruction content, and issues an instruction to the storage apparatus 300. The host computer 200 then creates an I/O request to register the start of page lock and optionally the content of the tier table 117 in the instruction content and issues an instruction to the storage apparatus 300. The storage apparatus 300 receives the two I/O requests and executes the page movement and page lock processing relating to the storage area designated in the I/O request. After completing the tiered storage control of the storage apparatus 300, the management computer 100 changes the file organization detail 11305 in the control target data management table 113 to data set. The management computer 100 then updates the values of the page locked capacity 11604 and 11605 in the tiered storage usage status management table 116. Here, the priority level is updated to high priority or low priority on the basis of the content configured for the priority level 11204 in the job in progress management table. That is, if the priority level 11204 in the job in progress management table 112 is high priority, the information of the high priority 11604 in the tiered storage usage status management table 116 is updated.

Meanwhile, if it is determined in step S3530 that the file organization of the executed job is not sequential but rather another file organization, the management computer 100 executes the same processing as the processing in a case where the file organization is VSAM or partitioned on the basis of the I/O frequency management table 115.

Figure 30:
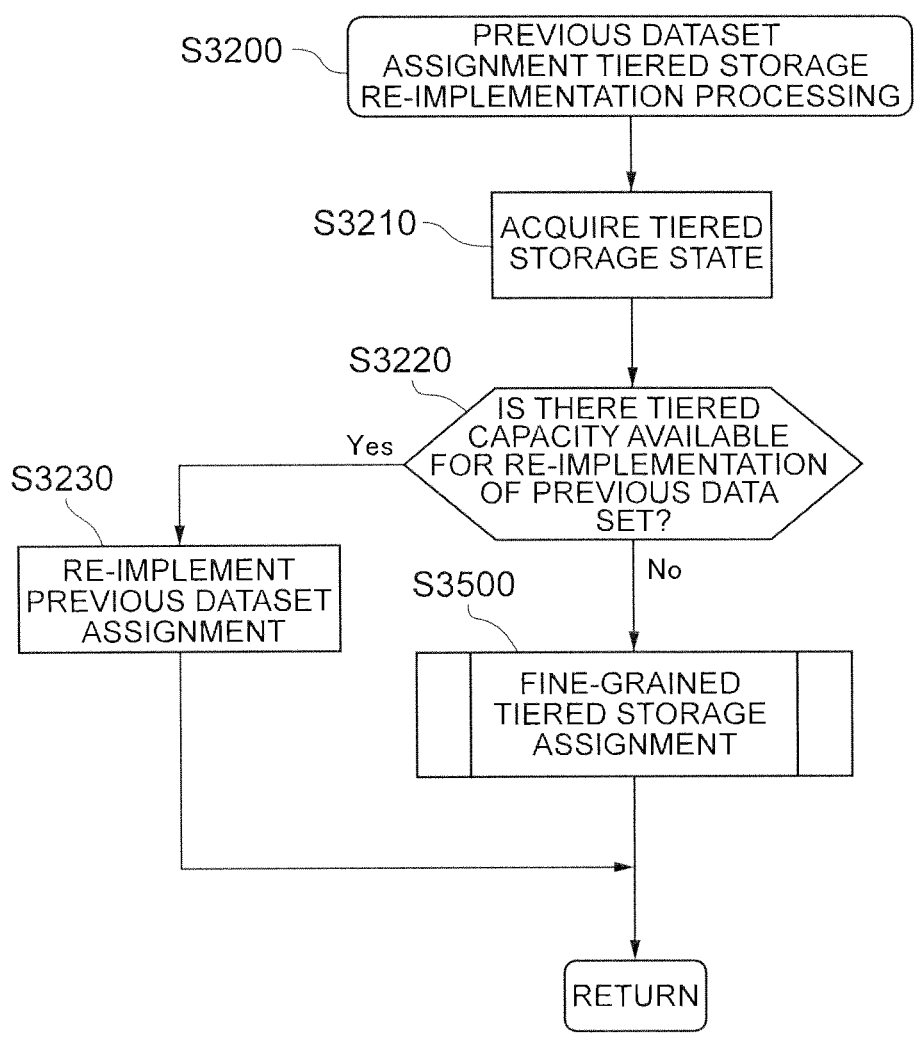
FIG. 30 is a flowchart showing a processing routine for processing to reproduce previous data set assignment tiered storage according to this embodiment.

The previous data set assignment tiered storage reproduction processing in step S3200 in FIG. 28 will be described next. FIG. 30 is a flowchart showing a processing routine for previous data set assignment tiered storage reproduction processing by the management computer 100.

The previous data set assignment tiered storage reproduction processing is processing for reproducing data placement in tiered storage by the tiered storage control processing if tiered storage control processing has been executed previously and if a high I/O performance which matches predetermined requirements was obtained. The previous data set assignment tiered storage reproduction processing is repeated each time the same job is executed. As a result of this processing, high I/O performance can always be provided in the execution of a job by the host computer 200 which is premised on repeated execution.

First, the management computer 100 acquires the status of the tiered storage of the storage apparatus 300 (S3210). More specifically, in order to ascertain the state of the tiered storage of the storage apparatus 300, the management computer 100 issues, to the host computer 200, an inquiry relating to the state of the tiered storage capacity in the storage apparatus 300. As a result of the instruction from the management computer 100, the host computer 200 creates an I/O request 7300 designating pool state acquisition as instruction content and issues the I/O request 7300 to the storage apparatus 300. The storage apparatus 300 which receives the I/O request references the tiered storage pool management information 1290 with the pool ID indicated in the I/O request and returns the tiered storage number, corresponding total capacity information, and unused total capacity information and the like to the host computer 200. The host computer 200 which receives the reply to the I/O request transfers the acquired information to the management computer 100. Upon receiving information from the host computer 200, the management computer 100 updates the area (full capacity 11602 and unused capacity 11603) in the tiered storage usage status management table 116.

The management computer 100 then determines whether the unused capacity of each tiered storage is sufficient for reproducing the previous data set (S3220). More specifically, the management computer 100 references the previous tier holding table 119 based on the previous tier pointer 11306 in the row in the table in which the name matches the data set used by the executed job in the control target data management table 113, and acquires information on the tiered storage assigned in the execution of the same previous job to the execution job usage data. The management computer 100 calculates the unused capacity required for each tier number by counting the number of rows in the address map with a common tier number in the previous tier holding table 119. Further, the management computer 100 references the unused capacity 11603 of the tiered storage usage status management table 116 and determines whether the unused capacity for each calculated tier number (tiered storage) exists in the pool of the storage apparatus 300.

If it is determined in step S3220 that unused capacity for reproducing the previous data set is available in the tiered storage, the tiered storage assigned to the data set employed by the previous executed job is reproduced (S3230). In specific terms, the management computer 100 replicates the content in the previous tier holding table 119 in the tier table 117, creates the I/O request 7300, and issues an instruction to the storage apparatus 300 via the host computer 200. The management computer 100 creates two types of I/O request 7300 and issues the requests sequentially to the storage apparatus 300. One I/O request 7300 registers the page tier movement and optionally the content in the tier table 117 in the instruction content. The second I/O request 7300 registers the start of a page lock and optionally the tier table 117 in the instruction content.

If it is determined in step S3220 that unused capacity sufficient for reproducing the previous data set is available in the tiered storage, the management computer 100 executes the aforementioned fine-grained tiered storage assignment processing (S3500) and returns the processing to the caller.

Figure 31:
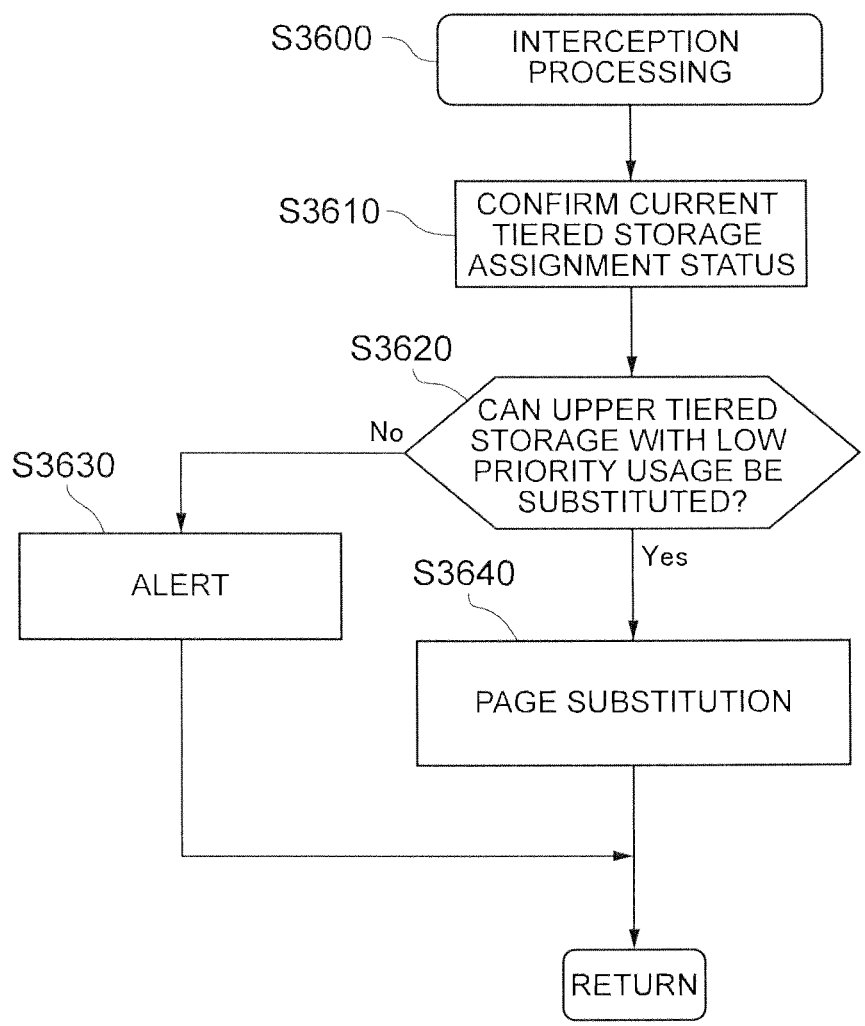
FIG. 31 is a flowchart showing a processing routine for interception processing according to this embodiment.

The interception processing in step S3600 of FIG. 29 will be described next. FIG. 31 is a flowchart showing a processing routine for interception processing by the management computer 100. The interception processing is processing in which, in a case where there is no unused capacity in the assignment destination tiered storage when the control target application data is assigned to the tiered storage, if there is data which uses the upper tiered storage among data of a lower priority than the application data, the area is substituted with the control target data. Consequently, high priority application data can be placed in tiered storage of very high I/O performance, and as a result priority can be given to high performance processing of a high priority application.

First, the management computer 100 confirms the assignment status of the current tiered storage (S3610). More specifically, the management computer 100 references the tiered storage usage status management table 116 and acquires a low priority page locked capacity in the upper tiered storage (the value of the tier number 11601 is 1, for example).

The management computer 100 subsequently determines whether it is possible to substitute the tiered storage control target data for data which is disposed in the low priority upper tiered storage (S3620). In specific terms, the management computer 100 determines whether the capacity of the tiered storage control target data is smaller than the unused capacity obtained in step S3610.

If it is determined in step S3620 whether the capacity of the tiered storage control target data is smaller than or equal to the unused capacity obtained in step S3610, the data of the tiered storage control target is substituted for the data disposed in the low priority upper tiered storage (S3640), and returns the processing to the caller.

If, on the other hand, it is determined in step S3620 that the capacity of the tiered storage control target data is greater than the unused capacity obtained in step S3610, the management computer 100 determines that the execution of interception processing is impossible and alerts the user of the management computer 100 (step S3630) and returns the processing to the caller.

Figure 32:
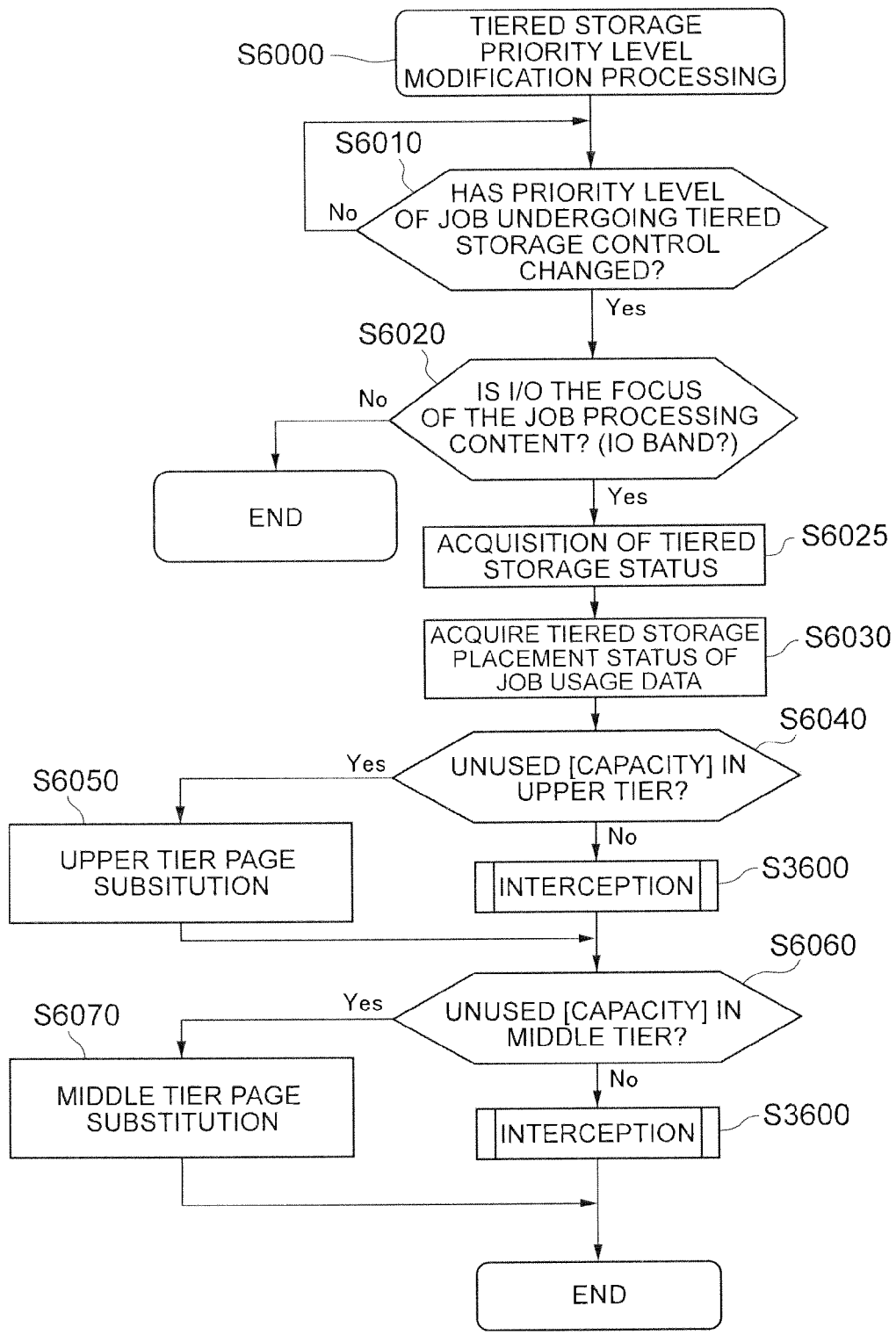
FIG. 32 is a flowchart showing a processing routine for tiered storage priority level modification processing according to this embodiment.

The tiered storage priority level modification processing at the operation stage will be described next. FIG. 32 is a flowchart showing a processing routine for tiered storage priority level modification processing by the management computer 100.

An application is executed by the host computer 200 in response to an instruction from the application processing part of the OS 212. If the application execution time is too long, the application processing part may change the priority level of the application to complete the processing early. If the application priority level is modified in the tiered storage priority level modification processing, the corresponding processing is carried out in the tiered storage control. For example, modification of the application priority level of a high priority application can be modified by moving data, among the data used by the application, which is disposed in low priority tiered storage, to upper tiered storage.

First, the management computer 100 determines whether the priority level of a job subjected to tiered storage control processing has been modified (S6010). If the priority level of the application is modified in the host computer 200, the host computer 200 issues notification of information (job name and the like) relating to the application which has undergone priority level modification to the management computer 100 by means of an instruction from the agent program. Hereinafter a job that has undergone priority level modification will be described as the job.

If it is determined in step S6010 from the notification of the host computer 200 that the job priority level has changed, the management computer 100 acquires the status of the tiered storage (S6025). More specifically, when notification that the priority level has changed is received from the host computer 200, the management computer 100 issues an instruction to the agent program 213 of the host computer 200 to investigate whether the job is I/O priority level processing.

If, on the other hand, it is determined in step S6010 that the processing is not processing relating to the I/O priority level, the management computer 100 ends the processing.

Furthermore, after step S6025, the management computer 100 executes the processing of step S6030. In step S6030, the management computer 100 commands the host computer 200 to seek the state of the tiered storage capacity in the storage apparatus 300. In response to the instruction from the management computer 100, the host computer 200 creates an I/O request 7300 which is obtained by designating pool state acquisition as the instruction content and issues the I/O request to the storage apparatus 300. Upon receipt of the I/O request, the storage apparatus 300 references the tiered storage pool management information 1290 with the pool ID designated in the I/O request of the storage apparatus 300 and sends back the tiered storage number and corresponding total capacity information together with unused total capacity information to the host computer 200. Upon receiving a reply to the I/O request, the host computer 200 transfers the information obtained to the management computer 100. Upon receipt of the information, the management computer 100 updates the area (full capacity 11602, the unused capacity 11603) in the tiered storage usage status management table 116.

Further, the management computer 100 investigates which tiered storage in the storage apparatus 300 the data used by the job is disposed in the host computer 200. More specifically, the management computer 100 specifies the data used by the job by referencing the job in progress management table 112. In addition, [the management computer 100] references the control target data management table 113 under the data set name obtained by referencing the job in progress management table 112 and specifies which volume in the storage apparatus 300 the data is disposed in. Furthermore, the management computer 100 issues an I/O request 7300 whose instruction content is volume tier state acquisition to the storage apparatus 300 via the host computer 200 and investigates which tiered storage in the storage apparatus 300 the data is disposed in. Upon receipt of this I/O request, the storage apparatus 300 acquires the relationship between the designated logical volume address and tier number by referencing the virtual logical volume management information 1270 and sends back the information together with a reply to the I/O request. When an I/O reply is returned from the storage apparatus 300, the management computer 100 configures the information obtained from a reply to the I/O request in the tier table 117.

The management computer 100 then determines whether there is unused capacity in the upper tier (S6040). More specifically, the management computer 100 references the tier table 117 and calculates the capacity of the data disposed in the middle tiered storage. Further, the management computer 100 checks that the calculated capacity is smaller than the unused capacity 11603 of the upper tiered storage of the tiered storage usage status management table 116 acquired in step S6025.

If it is determined in step S6040 that the data disposed in the middle tiered storage is smaller than or equal to the unused capacity of the upper tiered storage, among the data of the tier table 117, the management computer 100 rewrites the tier number 11703 in the middle tier to the upper tier and moves the data disposed in the middle tiered storage to the upper tiered storage by issuing two types of I/O request 7300 to the storage apparatus 300 via the host computer 200. Here, of the two I/O requests 7300, the instruction content of the first I/O request is page tier movement and the instruction content of the second I/O request is page lock.

If it is determined in step S6040 that the data disposed in the middle tiered storage is greater than the unused capacity in the upper tiered storage, the management computer 100 executes the foregoing interception processing 3600 (S3600).

The management computer 100 then determines whether there is unused capacity in the middle tier (S6060). More specifically, the management computer 100 references the tier table 117 and calculates the capacity of the data disposed in the lower tiered storage. Furthermore, the management computer 100 checks that the calculated capacity is smaller than the unused capacity 11603 of the middle tiered storage in the tiered storage usage status management table 116 acquired in step S6025.

If it is determined in step S6060 that the data disposed in the lower tiered storage is smaller than or equal to the unused capacity of the middle tiered storage, the management computer 100 rewrites, among the data stored in the tier table 117, the tier number 11703 in the lower tier to the middle tier. Further, similarly to step S6050, [the management computer 100] moves the data disposed in the lower tiered storage to the middle tiered storage by issuing two types of I/O request 7300 to the storage apparatus 300 via the host computer 200.

If it is determined in step S6040 that the data disposed in the lower tiered storage is greater than the unused capacity of the middle tiered storage, the management computer 100 executes the foregoing interception processing 3600 and ends the processing.

Figure 33:
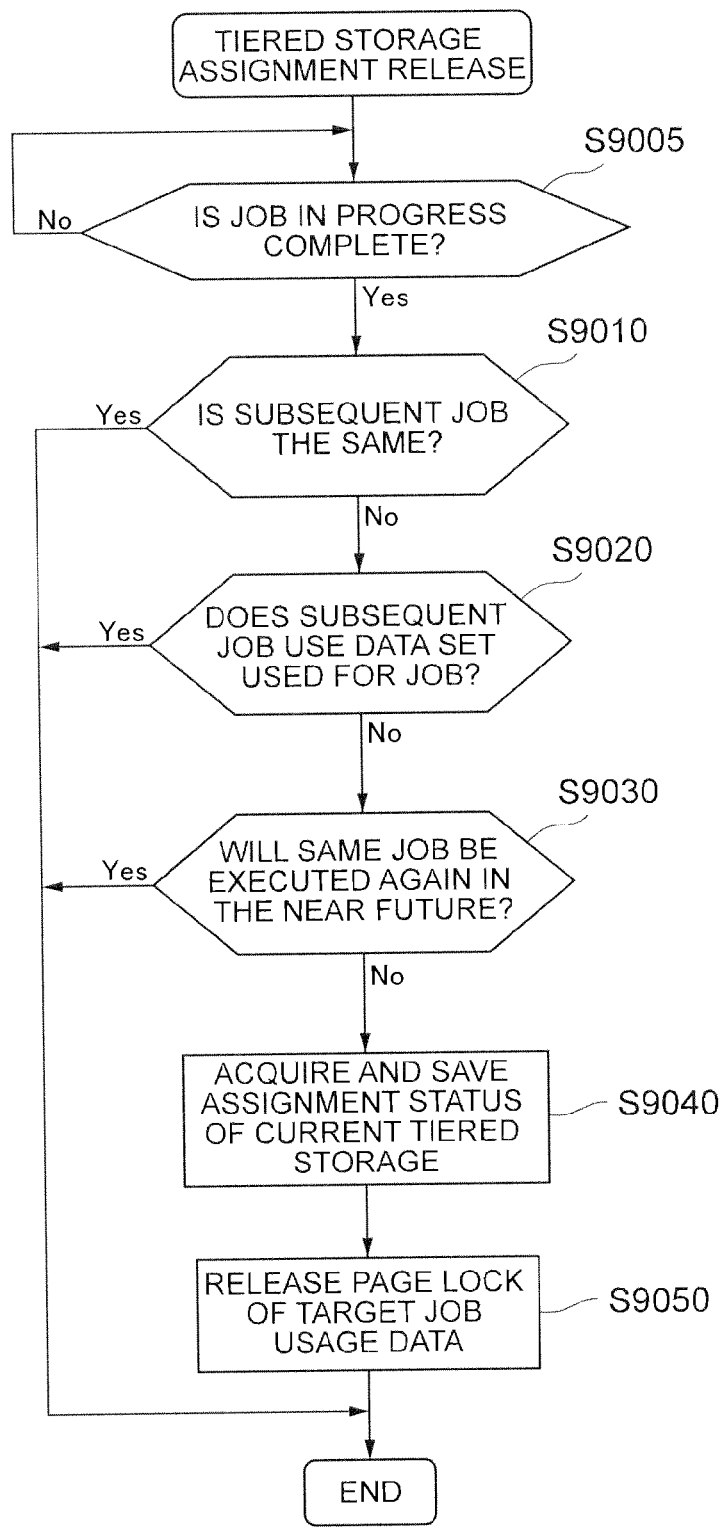
FIG. 33 is a flowchart showing a processing routine for tiered storage assignment release processing according to this embodiment.

Tiered storage assignment release processing at the operation stage will be described next. FIG. 33 is a flowchart showing a processing routine for tiered storage assignment release processing by the management computer 100. Upon detecting the fact that the job executed by the host computer 200 has ended, the tiered storage assignment release processing also ends the tier control processing of the data used by the job unless the same data is to be used in the next job.

First, the management computer 100 periodically monitors the job execution status via the agent program 213 of the host computer 200 to determine whether the job in progress has ended (S9005).

If it is determined in step S9005 that the job in progress has ended, the management computer 100 collects information on the job that has ended. The collected information is the job name and the job start time and the like. Here, a job whose end has been detected by the management computer 100 is called a complete job.

The management computer 100 then references the job in progress management table 112 to determine whether the same job as the complete job will be executed subsequently (step S9010). More specifically, the management computer 100 references the job in progress management table 112 and checks whether the job with the same job name as the complete job exists separately from the complete job in the same table.

If it is determined in step S9010 that the same job as the complete job exists, [the management computer 100] ends the processing without ending tiered storage control. Consequently, if the same job as the complete job is executed in the next job, the tiered storage assigned to the complete job usage data can also be re-used in the next job.

If, in step S9010, a job which is the same as the complete job does not exist in the next job, the management computer 100 checks whether the same data set as the data set used by the complete job is referenced in the next job (S9020). More specifically, the management computer 100 references the job in progress management table 112 and checks whether there is a job which references the same data set as the data set used by the complete job.

If it is determined in step S9020 that there is a job which references the same data set as the complete job, [the management computer 100] ends the processing without ending the tiered storage control. As a result, [the management computer 100] determines that the same data set as the complete job is referenced in the next job, and enables re-usage by the next job of the tiered storage assigned to the complete job usage data.

If it is determined in step S9020 that, in the next job, there is no job which references the same data set as the complete job, the management computer 100 determines whether the same job as the complete job is to be executed again in the near future (S9030). More specifically, the management computer 100 then checks whether the same job as the complete job has not been registered in the job scheduler which the OS 212 of the host computer 200 comprises. If the same job as the complete job has been registered in the job scheduler, the management computer 100 also checks whether the job in the scheduler is to be executed a short interval after the completion time of the complete job.

If it is determined in step S9030 that the same job as the complete job is to be executed at a nearby time interval, [the management computer 100] ends the processing without ending the tiered storage control for the job which is executed in the scheduler.

If, on the other hand, it is determined in step S9030 that the same job as the complete job is not to be executed at a nearby time interval, [the management computer 100] executes the processing of step S9040.

In step S9040, the management computer 100 acquires the assignment status of the current tiered storage and saves the assignment status. More specifically, the management computer 100 issues an I/O request (the instruction content is volume tier state acquisition) to the storage apparatus 300 via the host computer 200, and acquires the tiered storage placement for the data used by the complete job. Upon receiving the I/O request, the storage apparatus 300 references the virtual logical volume management information 1270 and extracts the virtual address 12703 and tier number 12704 in the same table, returning same to the I/O request source in response to the I/O request. The management computer 100 creates and archives the previous tier holding table 119 for the complete job usage data set on the basis of the I/O request results.

Here, the management computer 100 monitors the I/O performance of the job usage data using another means and may modify the information which is saved in the previous tier holding table 119 on the basis of this performance. For example, if the I/O performance of the job usage data is less than the expected performance, the management computer 100 may perform processing to change the tiered storage placement obtained from the storage system and change low tiered storage to high tiered storage and save the result in the previous tier holding table 119. As a result of this processing, [the management computer 100] is able to optimize the I/O performance of the next job on the basis of the actual I/O performance results of the job usage data and is able to bring the value close to the required value for the job I/O performance which was originally configured by the user.

The management computer 100 subsequently performs a procedure for releasing the tiered storage corresponding to the data set used by the previous job (S9040). More specifically, the management computer 100 configures the volume where the data set used by the previous job was disposed as the address and issues an I/O request 7300 in which the instruction content is page lock release to the storage apparatus 300. Upon receipt of the I/O request 7300, the storage apparatus 300 releases the designated page in the virtual logical volume that has been page-locked.

As a result of the tier storage assignment release processing at the operation stage hereinabove, data which has been used by the complete job can be re-used in the next job. Consequently, a high I/O performance can always be reproduced. By releasing the page lock while the next job is not being executed, upper tiered storage can be used for another job, thereby making effective usage of costly tiered storage.

(1-6) Advantageous Effects of Embodiment

As mentioned above, the present embodiment makes is possible to use file organization characteristics and draw out the data usage characteristics of an application by using the management computer 100 to manage the file organization of the data used by the application, thereby enabling implementation of tier control in units more precise than units such as the files managed by the OS (Operating System) or the like. Furthermore, in conjunction with the job operation of the host computer 200, limited tiered storage resources can be used effectively so that the costly upper tier is assigned only during job usage periods, which correspond to periods when the application is running. Consequently, the computer system 10 according to this embodiment makes it possible to always provide the high I/O performance sought by the user for the application data which is configured as a control target.

Furthermore, by detecting the job executed by the host computer 200 together with the data used by this job and examining the file organization of the data, the computer system 10 specifies an area with high referencing frequency in the data and exercises control to move the area disposed in the storage system to upper tiered storage and not to other tiered storage in the storage system. In addition, when job completion is detected, control is exercised to enable the job usage data to be moved from the upper tiered storage in the storage system. As described hereinabove, when a job is executed, control may be exercised to permit data which is referenced by the job to always be referenced with a high I/O performance. Further, if a job is not being executed, tiered storage in a storage system with limited resources can be effectively used by ensuring that data of this job is not disposed in upper tiered storage, whereby a high I/O performance can be provided by the whole computer system.

(2) Second Embodiment (2-1) Hardware Configuration of Computer System

A computer system according to a second embodiment of the present invention will be described next. According to the second embodiment of the present invention, effective control is possible by using the tiered storage precisely based on application behavior even for a computer system with no file organization.

Figure 34:
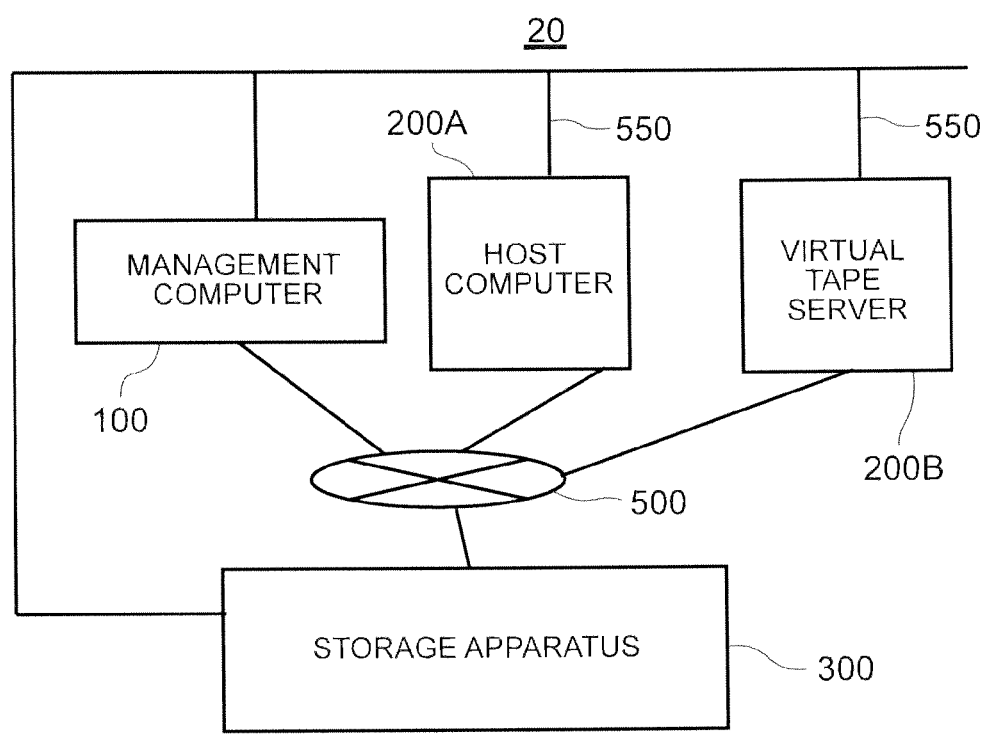
FIG. 34 is a block diagram showing a hardware configuration of a virtual tape system according to this embodiment.

This embodiment can be exemplified by a virtual tape system 20 shown in FIG. 34, for example. The virtual tape system 20 is configured from a management computer 100, a host computer 200A, a virtual tape server 200B, and a storage apparatus 300.

The virtual tape server 200B is a computer device comprising information processing resources such as a CPU (Central Processing Unit) and a memory, and is configured, for example, from a personal computer, a workstation or a mainframe. The CPU functions as an arithmetic processing unit and controls the operation of the host computer 200 according to a program or arithmetic parameters which are stored in memory. Furthermore, the virtual tape server 200B comprises information input devices such as a keyboard, switch, pointing device, and microphone, as well as information input devices such as a monitor display and speaker and so on.

In addition, the virtual tape server 200B is connected to the management computer 100, the host computer 200A, and the storage apparatus 300 via a network (not shown).

Note that the configuration of the management computer 100, the host computer 200A, and the storage apparatus 300 according to this embodiment is the same configuration as that of the management computer 100, the host computer 200, and the storage apparatus 300 according to the first embodiment, and hence a detailed description is not included.

(2-2) Details of the Operation of the Virtual Tape System

In the virtual tape system 20, the virtual tape server 200B or the like virtualizes the storage apparatus 300 so that, based on a tape control instruction from the host computer 200A, a tape appears to operate in the host computer 200A. Thus, in the virtual tape system 20, the storage apparatus 300 is virtualized as a virtual tape and data which is contained in the tape control instruction received from the host computer is saved to a disk drive, and data is read from a saved disk drive in response to a request from the host computer 200A.

Figure 35:
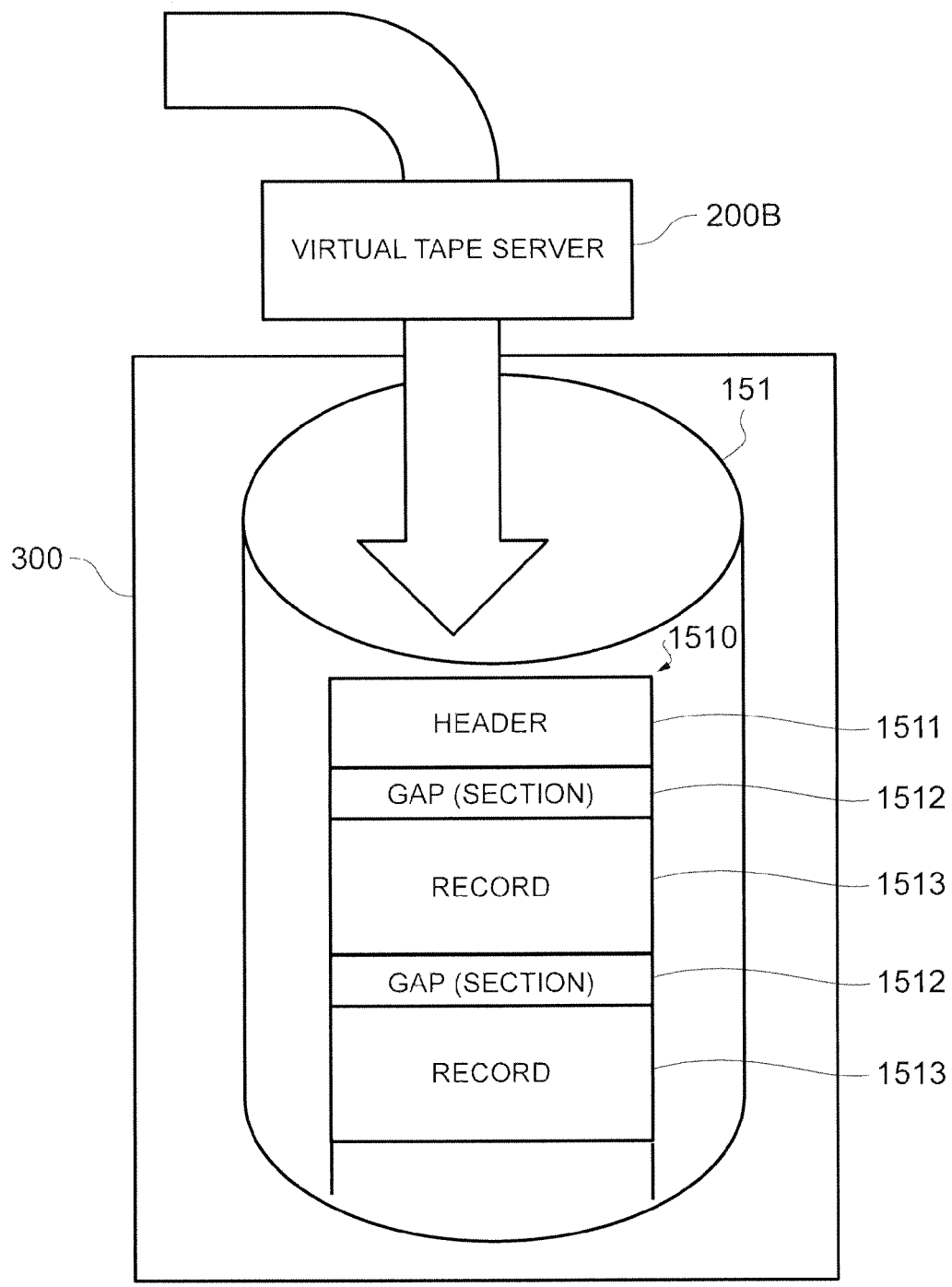
FIG. 35 is a conceptual diagram showing data of a tape format according to this embodiment.

Furthermore, in the virtual tape system 20, data in tape format is saved in a logical volume 151. FIG. 35 shows an example of data in tape format.

As shown in FIG. 35, in addition to a header 1511 where data-related information is archived, the virtual tape format 1510 is configured from a gap 1512 for partitioning and archiving data and a record 1513 which is of a suitable capacity for transferring data to the host computer.

When a virtual tape is referenced, as in the case of a tape, the virtual tape is referenced via a header in tape format. Therefore, the format of a virtual tape is said to have a higher data referencing frequency the closer the data is to the header. Therefore, as per FIG. 36, a virtual data set with a "virtual tape" file organization is managed in the I/O frequency management table 115 of the management computer 100. That is, if the file organization is "virtual tape", "header" is stored in the high frequency I/O 1 field 11502 as the data with the highest I/O frequency, "upper area" is stored as the data with the next highest I/O frequency in the high frequency I/O 2 field 11503, and "virtual server tool" is stored in the acquisition method 11504 field as means for acquiring an area in the logical volume of the high frequency I/O area.

The same precise tier control as the file organization described in the first embodiment can be realized by utilizing the foregoing I/O frequency management table 115.

Moreover, in the virtual tape system 20, data referencing of the storage apparatus 300 is started in response to a tape mount instruction from the host computer 200. Further, data referencing of the storage apparatus 300 is ended in response to a tape mount instruction from the host computer 200. This corresponds to the job start and job end of the foregoing first embodiment.

In this embodiment, the management computer 100 detects that the virtual tape server 200B has received a tape control instruction from the host computer 200A. The management computer 100 parses the detected tape control instruction and, if the tape control instruction is a tape mount instruction, executes tier control processing based on the job input shown in FIG. 28. However, if the parsed tape control instruction is a tape unmount instruction, the management computer 100 executes the tiered storage assignment parsing processing in FIG. 33.

REFERENCE SIGNS LIST

100 Management computer
101 Storage information table
111 Storage management program
112 Job in progress management table
113 Control target data management table
114 User configuration information management table
115 I/O frequency management table
116 Tiered storage usage status management table
117 Tier table
118 Host configuration management table
119 Previous tier holding table
200 Host computer
211 Application program
213 Agent program
300 Storage apparatus
1200 Shared memory
1220 Virtual volume processing program
1230 Copy processing program
1240 I/O processing program
1250 Volume management information
1260 Storage basic information

1270 Virtual logical volume management information
1290 Tiered storage pool management information
1300 I/O controller
1310 Processor
1320 Transceiver
1330 Memory
1400 Disk controller
1500 Disk drive

The invention claimed is:

1. A storage system comprising:
a host computer configured to execute a plurality of application simultaneously; and
a management computer,
wherein a storage apparatus and the host computer are connected, the host computer including non-transitory computer media storing a storage program that is executable by the host computer,
wherein the host computer is configured to be operably coupled to the management computer,
wherein the host computer is configured to:
designate an application name of an application targeted for execution and prescribed by a job;
designate a data set name for the application targeted for execution as the job;
designate at least one of a job name, a job class, and a job user;
initiate the job upon receiving an indication from a user to execute the job, wherein:
the host computer comprises processing components including a job reception module, a job spool module, and an application execution module;
when the user provides the indication to execute the job, the job reception module receives the job and instructs the host computer to acquire information prescribed by the job;
the job spool module is configured to postpone execution of the job until the application execution module enables job processing;
when the application execution module enables the job processing, the host computer is configured to switch processing from processing by the job spool module to processing by the application execution module;
the application execution module is configured to execute the application prescribed by the job such that upon execution of the application, application program data prescribed by the job is referenced; and
upon completion of the processing by the application execution module, the host computer is configured to execute processing to end the job,
wherein the management computer is configured to:
execute tiered storage control processing based on file organization of an executed job detected in a tiered storage assignment operation by acquiring file organization information of an executed job from a control target data management table;
acquire, from an I/O frequency management table, (1) highest frequency area information on areas accessed with a highest frequency in the file organization of the executed job and (2) next highest frequency area information on areas accessed with a next highest frequency in the file organization of the executed job;
judge, in carrying out the tiered storage control, whether there is top tiered storage capacity available for a data set based on the acquired (1) highest frequency area information and (2) next highest frequency area information;
determine, based on a result of the judgment, whether the data set is storable in an upper tiered storage; and
assign the data set to the upper tier storage when it is determined that the data set is storable in the upper tiered storage.

2. The storage system according to claim 1, wherein:
the management computer is configured to acquire a state of tiered storage of the storage apparatus connected to the host computer;
the management computer is configured to carry out tiered storage assignment processing after acquiring the state of tiered storage of the storage apparatus;
the management computer is configured to issue an instruction related to a state of storage capacity of the tiered storage to the host computer;
upon receipt of the instruction, the host computer is configured to create an I/O request designating a pool state acquisition as instruction content, and to issue the I/O request to the storage apparatus, the I/O request indicating a pool ID;
the storage apparatus configured to receive the I/O request is further configured to reference tiered storage pool management information containing the pool ID indicated in the I/O request;
the storage apparatus is further configured to send a tiered storage number, total capacity information, and unused total capacity information to the host computer in an I/O request reply; and
upon receiving the I/O request reply, the management computer is configured to update a tiered storage usage management computer.

3. The storage system of claim 2, wherein:
the management computer is configured to determine whether the file organization is virtual storage access;
when the file organization is virtual storage access, the management computer is configured to execute processing so as to carry out tiered storage control of virtual storage access file organization;
the management computer is configured to ascertain, as a result of acquiring the I/O frequency management table, that an area with the highest I/O frequency is an index area, and an area with the next highest I/O frequency is the data set; and
the management computer is configured to reference unused capacity in the tiered storage usage status management table so as to determine whether the data set is storable in the upper tiered storage.

4. The storage system of claim 3, wherein:
the management computer is configured to assign the data set to the upper tier storage when the management computer determines that the data set is storable in the upper tiered storage by registering the data set and corresponding tier numbers in a tier table and providing a command to the host computer to execute page tier movement and to initiate a page lock in accordance with the tier table;
upon receiving the command, the host computer is configured to create a first I/O request to register page tier movement and a second I/O request to register initiation of the page lock, and to issue an instruction to the storage apparatus;
the storage apparatus is configured to receive the first and second I/O requests and to perform page movement and page lock processing in accordance with the respective requests; and the management computer is configured to update values of page locked capacity in the tiered storage usage management table, and to designate a priority level for the job.

5. The storage system of claim 3, wherein:
the management computer is configured to assess upper tier capacity when the management computer determines that the data set is not storable in the upper tiered storage; and
the management compute is configured to assess the upper tier capacity by referencing unused capacity in a tiered storage usage status management table, and by referencing the unused capacity to determine whether an index area with a highest referencing frequency in the data set used by the job is storable in the upper tiered storage.

6. The storage system of claim 5, wherein:
when the management computer determines that the index area is storable in the upper tiered stage, the management computer instructs the storage apparatus to perform the tiered storage control;
upon performance of the tiered stage control, the management computer is configured to adjust file organization details in a control target data management table and to update the tiered storage usage status management table; and
when the management computer determines that the index area is not storable in the upper tiered storage, the management computer is configured to execute interception processing.

7. The storage system of claim 3, wherein when the management computer determines that the file organization is not virtual storage access and is partitioned organization, the management computer is configured to:
determine whether upper tiered storage capacity is available for a first area of the data set by acquiring partitioned organization information and I/O frequency information from an I/O frequency management table;
ascertain whether an area with a highest I/O frequency is a directory area; and
reference unused capacity to determine whether the directory area is storable in upper tiered area within the data set used by the job.

8. The storage system of claim 3, wherein when the management computer determines that the file organization is sequential organization, the management computer is configured to perform tiered storage control for sequential file organization, comprising:
determining whether upper tiered storage capacity is available for a volume table of contents (VTOC) area by acquiring partitioned organization information and I/O frequency information from an I/O frequency management table;
ascertaining whether an area with a highest I/O frequency is a VTOC area;
referencing unused capacity to determine whether the VTOC area is storable in upper tiered area within the data set used by the job.

9. The storage system of claim 3, wherein:
the management computer is configured to perform assignment tiered storage reproduction processing so as to reproduce data in the tiered storage by the tiered storage control processing, when the tiered storage control processing is executed previously and when an I/O performance meets a predetermined threshold performance.

10. The storage system of claim 3, wherein:
the management computer is configured to determine the unused capacity required for each tier number by calculating a number of rows in an address map with a common tier number, and is further configured to reference a previous tier based on a previous tier pointer so as to determine whether the unused capacity for each of a plurality of storage tiers suffices for reproduction of a previous data set.

11. A storage hierarchy control method for a storage system in which a storage apparatus, a host computer configured to communicate with the storage apparatus, and a management computer configured to manage the storage apparatus and the host computer that are interconnected via a network, the management computer being operably coupled to the host computer, the method comprising:
designating an application name of an application targeted for execution and prescribed by a job;
designating a data set name for the application targeted for execution as the job;
designating at least one of a job name, a job class, and a job user;
initiating the job upon receiving an indication from a user to execute the job, the host computer comprising processing components including a job reception module, a job spool module, and an application execution module;
when the user provides the indication to execute the job, receiving, in the job reception module the job and instructing the host computer to acquire information prescribed by the job;
postponing execution, by the job spool module, of the job until the application execution module enables job processing;
enabling job processing by the application execution module, and thereafter switching processing from processing by the job spool module to processing by the application execution module;
executing the application prescribed by the job by the application execution module such that upon execution of the application, application program data prescribed by the job is referenced;
upon completion of the processing by the application execution module, executing processing by the host computer to end the job;
executing tiered storage control processing based on file organization of an executed job detected in a tiered storage assignment operation by acquiring file organization information of an executed job from a control target data management table;
acquiring, from an I/O frequency management table, (1) highest frequency area information on areas accessed with a highest frequency in the file organization of the executed job and (2) next highest frequency area information on areas accessed with a next highest frequency in the file organization of the executed job;
judging, in carrying out the tiered storage control, whether there is top tiered storage capacity available for a data set based on the acquired (1) highest frequency area information and (2) next highest frequency area information;
determining, based on a result of the judgment, whether the data set is storable in an upper tiered storage; and
assigning the data set to the upper tier storage when it is determined that the data set is storable in the upper tiered storage.

12. The storage hierarchy control method according to claim 11, further comprising:
- acquiring a state of tiered storage of the storage apparatus connected to the host computer;
- carrying out tiered storage assignment processing after acquiring the state of tiered storage of the storage apparatus;
- issuing an instruction related to a state of storage capacity of the tiered storage to the host computer;
- upon receipt of the instruction, creating an I/O request designating a pool state acquisition as instruction content, and issuing the I/O request to the storage apparatus, the I/O request indicating a pool ID;
- receiving, by the storage apparatus, the I/O request and referencing tiered storage pool management information containing the pool ID indicated in the I/O request;
- sending, by the storage apparatus, a tiered storage number, total capacity information, and unused total capacity information to the host computer in an I/O request reply; and
- upon receipt of the I/O request reply by the management computer, updating a tiered storage usage management computer.

13. The storage hierarchy control method according to claim 12, further comprising:
- determining whether the file organization is virtual storage access;
- when the file organization is virtual storage access, executing processing so as to carry out tiered storage control of virtual storage access file organization;
- ascertaining, as a result of acquiring the I/O frequency management table, that an area with the highest I/O frequency is an index area, and an area with the next highest I/O frequency is the data set; and
- referencing unused capacity in the tiered storage usage status management table so as to determine whether the data set is storable in the upper tiered storage.

14. The storage hierarchy control method according to claim 13, further comprising:
- assigning the data set to the upper tier storage when the management computer determines that the data set is storable in the upper tiered storage by registering the data set and corresponding tier numbers in a tier table and providing a command to the host computer to execute page tier movement and to initiate a page lock in accordance with the tier table;
- upon receiving the command, creating a first I/O request to register page tier movement and a second I/O request to register initiation of the page lock, and issuing an instruction to the storage apparatus;
- receiving the first and second I/O requests and performing page movement and page lock processing in accordance with the respective requests; and
- updating values of page locked capacity in the tiered storage usage management table, and designating a priority level for the job.

15. The storage hierarchy control method according to claim 13, further comprising:
- assessing upper tier capacity when the management computer determines that the data set is not storable in the upper tiered storage,
- assessing the upper tier capacity by referencing unused capacity in a tiered storage usage status management table, and by referencing the unused capacity to determine whether an index area with a highest referencing frequency in the data set used by the job is storable in the upper tiered storage.

16. The storage hierarchy control method according to claim 15, further comprising:
- upon determining that the index area is storable in the upper tiered stage, instructing the storage apparatus to perform the tiered storage control;
- upon performance of the tiered stage control, adjusting file organization details in a control target data management table and updating the tiered storage usage status management table; and
- upon determining that the index area is not storable in the upper tiered storage, executing interception processing.

17. The storage hierarchy control method according to claim 13, wherein:
- upon determining that the file organization is not virtual storage access and is partitioned organization, further determining whether upper tiered storage capacity is available for a first area of the data set,
- wherein determining whether the upper tiered storage is available comprises:
- acquiring partitioned organization information and I/O frequency information from an I/O frequency management table;
- ascertaining whether an area with a highest I/O frequency is a directory area; and
- referencing unused capacity to determine whether the directory area is storable in upper tiered area within the data set used by the job.

18. The storage hierarchy control method according to claim 13, further comprising:
- upon determining that the file organization is sequential organization, performing tiered storage control for sequential file organization, the tiered storage control comprising:
- determining whether upper tiered storage capacity is available for a volume table of contents (VTOC) area by acquiring partitioned organization information and I/O frequency information from an I/O frequency management table;
- ascertaining whether an area with a highest I/O frequency is a VTOC area; and
- referencing unused capacity to determine whether the VTOC area is storable in upper tiered area within the data set used by the job.

19. The storage hierarchy control method according to claim 13, further comprising:
- performing assignment tiered storage reproduction processing so as to reproduce data in the tiered storage by the tiered storage control processing, when the tiered storage control processing is executed previously and when an I/O performance meets a predetermined threshold performance.

20. The storage hierarchy control method according to claim 13, further comprising:
- determining the unused capacity required for each tier number by calculating a number of rows in an address map with a common tier number, and referencing a previous tier based on a previous tier pointer so as to determine whether the unused capacity for each of a plurality of storage tiers suffices for reproduction of a previous data set.

* * * * *